(12) United States Patent
Karam et al.

(10) Patent No.: US 11,933,992 B2
(45) Date of Patent: Mar. 19, 2024

(54) LIQUID LENS INTERFACE CONTROL SYSTEMS AND METHODS

(71) Applicant: CORNING INCORPORATED, Corning, NY (US)

(72) Inventors: Raymond Miller Karam, Santa Barbara, CA (US); Thomas Mikio Wynne, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 686 days.

(21) Appl. No.: 17/056,978

(22) PCT Filed: May 21, 2019

(86) PCT No.: PCT/US2019/033308
§ 371 (c)(1),
(2) Date: Nov. 19, 2020

(87) PCT Pub. No.: WO2019/226647
PCT Pub. Date: Nov. 28, 2019

(65) Prior Publication Data
US 2021/0231966 A1    Jul. 29, 2021

Related U.S. Application Data

(60) Provisional application No. 62/675,047, filed on May 22, 2018.

(51) Int. Cl.
*G02B 27/64* (2006.01)
*G02B 3/14* (2006.01)

(52) U.S. Cl.
CPC ............. *G02B 27/646* (2013.01); *G02B 3/14* (2013.01); *G02B 2207/115* (2013.01)

(58) Field of Classification Search
CPC .......... G02B 7/09; G02B 3/14; G02B 27/646; G02B 27/64; G02B 1/06; G02B 3/12; G02B 2207/115; H04N 5/23248; H04N 5/23264; H04N 5/2328; H04N 5/23287; H04N 5/2257; G03B 2217/005; G03B 2205/00; G03B 9/06; G03B 5/06; G03B 13/36
(Continued)

(56) References Cited

U.S. PATENT DOCUMENTS

| 2014/0017625 A1* | 1/2014 | Liu | ......................... A61B 1/042 433/29 |
| 2020/0064524 A1* | 2/2020 | Moon | ..................... G02B 27/64 |
| 2020/0096678 A1* | 3/2020 | Kaminski | ................ G02B 3/14 |

FOREIGN PATENT DOCUMENTS

EP    2071367 A1    6/2009

OTHER PUBLICATIONS

International Search Report and Written Opinion of the International Searching Authority; PCT/US2019/033308; dated Aug. 29, 2019; 9 Pages; European Patent Office.

* cited by examiner

*Primary Examiner* — Arnel C Lavarias
(74) *Attorney, Agent, or Firm* — Tamika A. Crawl-Bey

(57) ABSTRACT

A liquid lens can tilt a fluid interface, such as for optical image stabilization or off-axis focus. Tilting the interface can cause coma aberration or other dynamic wavefront error. The liquid lens can be driven to reduce the coma aberration or other dynamic wavefront error. For example, input shaped signals can be used. In some cases, the signals can be overdriven and/or underdriven, which can increase response time, and/or encourage settling of the interface.

19 Claims, 17 Drawing Sheets

(58) Field of Classification Search
USPC .............. 359/554, 557, 642, 648, 665, 666;
250/201.1, 201.2, 201.4; 348/208.99,
348/208.2, 208.12; 396/52, 55
See application file for complete search history.

LIQUID LENS INTERFACE CONTROL SYSTEMS AND METHODS

CROSS-REFERENCE TO RELATED APPLICATIONS

This application claims the benefit of priority under 35 U.S.C. § 371 of International Application No. PCT/US2019/033308, filed on May 21, 2019, which claims the benefit of U.S. Provisional Patent Application No. 62/675,047, filed May 22, 2018, and titled LIQUID LENS CONTROL SYSTEMS AND METHODS. The entirety contents of the above-identified application are hereby incorporated by reference herein and made part of this specification for all that they disclose.

BACKGROUND

Field of the Disclosure

Some embodiments of this disclosure relate to liquid lenses, control systems for liquid lenses, and control methods for liquid lenses. Some examples herein more specifically discuss control systems and control methods for controlling a liquid lens for optical image stabilization.

Description of the Related Art

Although various control systems for liquid lenses are known, there remains a need for improved control systems and methods.

SUMMARY

Certain example embodiments are summarized below for illustrative purposes. The embodiments are not limited to the specific implementations recited herein. Embodiments may include several novel features, no single one of which is solely responsible for its desirable attributes or which is essential to the embodiments.

Some embodiments disclosed herein can relate to a liquid lens system, which can include a liquid lens having a chamber, a first fluid contained in the chamber, and a second fluid contained in the chamber. In some cases, the first fluid and the second fluid can be substantially immiscible. An interface (e.g., fluid interface) can be between the first fluid and the second fluid. A plurality of driving electrodes can be insulated from the first and second fluids. A common electrode can be in electrical communication with the first fluid. The liquid lens can be configured such that a position of the fluid interface can be based at least in part on voltage differentials applied between the plurality of driving electrodes and the common electrode. The system can have a signal generator, which can be configured to apply the voltage differentials between the plurality of driving electrodes and the common electrode. The system can have a controller.

In some embodiments, the controller can be configured to receive motion or orientation information, and cause the signal generator to provide shaped voltage signals to one or more of the plurality of driving electrodes, such as based on the motion or orientation information. The shaped voltage signals can be configured such that deformations in the fluid interface produced by a first portion of the shaped voltage signals can be at least partially canceled by a second portion of the shaped voltage signals.

The system can have a sensor configured to output the motion or orientation information. The sensor can be a gyroscope or accelerometer, or any other suitable type of sensor. The shaped voltage signals can include a base waveform, which can be configured to tilt the fluid interface in response to the motion or orientation information. The base waveform can have a first frequency. The shaped voltage signals can include a superimposed waveform that is superimposed onto the base waveform. The superimposed waveform can have a second frequency that is higher than the first frequency. The superimposed waveform can be a sinusoidal waveform, a square waveform, a sawtooth waveform, or a triangle waveform, or any other suitable type of waveform. The superimposed waveform can be a rounded-corner triangle waveform, or rounded-corner sawtooth waveform, or a rounded-corner square waveform. The superimposed waveform can reduces a dynamic wavefront error (e.g., coma aberration), such as caused by the fluid interface while the fluid interface is tilting. A frequency profile of the superimposed waveform and/or the shaped voltage signal can include multiple frequency components outside of an omission range and does not include frequency components inside of the omission range, wherein the omission range includes a surface wave response frequency. A frequency profile of the superimposed waveform and/or the shaped voltage signal can include a plurality of frequency components below a cutoff frequency and can omit frequency components that are above the cutoff frequency. The cutoff frequency can be lower than a surface wave response rate frequency of the liquid lens. The controller can be configured to set an amplitude of the superimposed waveform based at least in part on a rate of tilting of the fluid interface. The controller can be configured to increase the amplitude of the superimposed waveform in response to a higher rate of tilting. The controller can implement feedforward control based on the motion or orientation information from the sensor. The controller can be configured to process a signal indicative of the motion or orientation information and set an amplitude of the waveform based at least in part on a first value for the signal received at a first time, and a second value for the signal received at an earlier time. The controller can be configured to determine tilt control signals for the plurality of driving electrodes based at least in part on the motion or orientation information, determine input shaping waveforms based at least in part on the corresponding tilt control signals, and combine the input shaping waveforms with the corresponding tilt control signals to produce the shaped voltage signals. The amplitudes of the input shaping waveforms can be determined based at least in part on the rates of change of the corresponding tilt control signals.

Some embodiments disclosed herein can relate to a liquid lens system, which can include a chamber containing a first fluid and a second fluid. An interface can be between the first fluid and the second fluid. In some cases, the first fluid and the second fluid can be substantially immiscible. A first electrode can be insulated from the first and second fluids. A second electrode can be in electrical communication with the first fluid. The system can have a signal generator and a controller. In some embodiments, the controller can be configured to cause the signal generator to generate an input shaping waveform, such as in response to a signal indicative of shaking.

The liquid lens system can have a sensor, which can be configured to measure shaking and generate the signal indicative of shaking. The sensor can be a gyroscope. The input shaping waveform can be a sinusoidal waveform, a square waveform, a sawtooth waveform, a triangle waveform, or an oscillating waveform. The input shaping waveform can be a rounded-corner triangle waveform or rounded-corner sawtooth waveform. The input shaping waveform can reduce coma aberration caused by the tilting fluid interface.

Some embodiments disclosed herein can relate to a method for reducing dynamic wavefront error in a liquid lens. The method can include generating an input shaping waveform in response to a tilting of a chamber. The chamber can include a first fluid, a second fluid, which in some cases can be substantially immiscible with the first fluid. An interface can be between the first fluid and the second fluid. The method can include applying a voltage signal that comprises the input shaping waveform to an electrode to tilt the fluid interface.

The tilting can be detected with a gyroscope or other suitable sensor type. The input shaping waveform can reduce coma aberration produced by tilting the fluid interface. The method can include determining a tilt control signal based on the detected tilting. The tilt control signal can be configured to tilt the fluid interface to perform optical image stabilization. The method can include determining the input shaping waveform based on the tilt control signal. The method can include applying a shaped voltage signal to the electrode that includes both the tilt control signal and the input shaping waveform. The method can include setting an amplitude of the input shaping waveform based at least in part on a rate of change in the tilt control signal. The method can include increasing the amplitude of the input shaping waveform in response to a higher rate of change in the corresponding tilt control signal.

Some embodiments disclosed herein can relate to a liquid lens system, which can include a liquid lens having a chamber, a first fluid contained in the chamber, and a second fluid contained in the chamber. An interface can be between the first fluid and the second fluid. A plurality of driving electrodes can be insulated from the first and second fluids. A common electrode can be in electrical communication with the first fluid. The liquid lens can be configured such that a position of the interface is based at least in part on voltage differentials applied between the plurality of driving electrodes and the common electrode. The system can have a signal generator, which can be configured to apply the voltage differentials between the plurality of driving electrodes and the common electrode.

A controller can be configured to access angular velocity data indicative of an angular velocity of movement of the liquid lens. The controller can be configured to determine drive voltage signals at least in part by applying positive gain values for a first angular velocity range, and applying negative gain values for a second angular velocity range. The controller can cause the signal generator to provide the drive voltage signals to one or more of the corresponding diving electrodes.

The liquid lens system can have a motion or orientation sensor, and the angular velocity data can be received from or derived from the motion or orientation sensor. The controller can be configured to implement optical image stabilization. The controller can be configured to determine the drive voltage signals based additionally in part on target focal length information. The controller can be configured to perform a transfer function to apply the positive gain and to apply the negative gain. The controller can be configured to determine drive voltage signals at least in part applying a phase gain filter. The controller can be configured to determine drive voltage signals at least in part applying a Bessel filter. The controller can be configured to apply the positive gain and the negative gain to effectively phase shift the drive voltage signals, such as ahead of the angular velocity data. The controller can be configured to determine elevated target tilt angles that are greater than actual tilt angles of the liquid lens for applying the positive gain, such as to provide overdriven drive voltage signals. The controller can be configured to determine attenuated target tilt angles that are lesser than actual tilt angles of the liquid lens, such as for applying the negative gain to provide underdriven drive voltage signals. The controller can be configured to determine the drive voltage signals using angular position data and angular acceleration data. The drive voltage signals can be input shaped signals. The controller can be configured to determine the drive voltage signals by adding frequency content at one or more frequencies above an oscillation frequency of the movement of the liquid lens.

Some embodiments disclosed herein can relate to a method for operating a liquid lens. The method can include accessing signals indicative of movement of a liquid lens. The liquid lens can have a chamber with a first fluid, a second fluid, and an interface between the first fluid and the second fluid. The liquid lens can have electrodes configured to receive electrical signals to control the interface. The method can include determining drive signals, such as based at least in part on the signals indicative of movement of the liquid lens. In some embodiments, the drive signals can be determined at least by applying a phase gain filter, which can effectively phase shift the drive signals ahead of the signals indicative of movement of the liquid lens. The method can include applying the drive signals to the electrodes to tilt the interface.

The method can include applying a Bessel filter to determine the drive signals. The method can include applying a transfer function to determine the drive signals. The method can include applying positive gain during at least a portion of a time that a tilt angle of the liquid lens is increasing, and applying negative gain during at least a portion of a time that the tilt angle of the liquid lens is decreasing.

Some embodiments disclosed herein can relate to a dynamic lens system, which can include a chamber containing an interface between a first fluid and a second fluid. The system can include a plurality of electrodes, and the interface can be movable by applying drive signals to the plurality of electrodes. The system can have a signal generator configured to deliver the drive signals to the plurality of electrodes, and a controller. The controller can be configured to cause the signal generator to output input shaped drive signals to tilt the interface.

The controller can be configured to receive target tilt information and to determine the input shaped drive signals based at least in part on the target tilt information. The controller can be configured to cause the signal generator to output overdriven drive signals to the electrodes. The overdriven drive signals can correspond to tilt amounts larger than the target tilt information. The controller can cause the signal generator to output underdriven drive signals to the electrodes, wherein the underdriven drive signals correspond to tilt amounts lesser than the target tilt information. The target tilt information can include oscillating target tilt amounts for optical image stabilization. The controller can be configured to apply a Bessel filter to determine the drive signals. The controller can be configured to apply a transfer function to determine the drive signals. The controller can be configured to effectively phase shift the drive signals. The target tilt information can include a target tilt step response. The input shaped drive signals can be configured to tilt the interface with less dynamic wavefront error than would result from tilting the interface with drive signals based directly on the target tilt information. The dynamic lens system can include a sensor for measuring motion or orientation of the chamber. The target tilt information can be determined from the measured motion or orientation of the chamber.

Some embodiments disclosed herein can relate to a method for tilting an interface of a liquid lens. The method can include accessing target tilt information corresponding to target tilt amounts for the interface of the liquid lens. The liquid lens can have the interface between a first fluid and a second fluid, and a plurality of electrodes configured to control the interface. During a first time period, the method can include applying overdriven drive signals to the electrodes. The overdriven drive signals can correspond to tilt amounts larger than the target tilt amounts. During a second time period, the method can include applying underdriven drive signals to the electrodes. The underdriven drive signals can correspond to tilt amounts lesser than the target tilt amounts.

The target tilt information can include a tilt step response. The target tilt information can include oscillating tilt amounts for optical image stabilization. The overdriven drive signals and the underdriven drive signals can at least partially compensate for phase lag that results from tilting the interface.

BRIEF DESCRIPTION OF THE DRAWINGS

Certain embodiments will be discussed in detail with reference to the figures, wherein like reference numerals refer to similar features throughout.

The figures are provided for illustrative purposes and the embodiments are not limited to the specific implementations illustrated in the figures.

DETAILED DESCRIPTION OF CERTAIN EMBODIMENTS

Liquid Lens Overview

Figure 1:
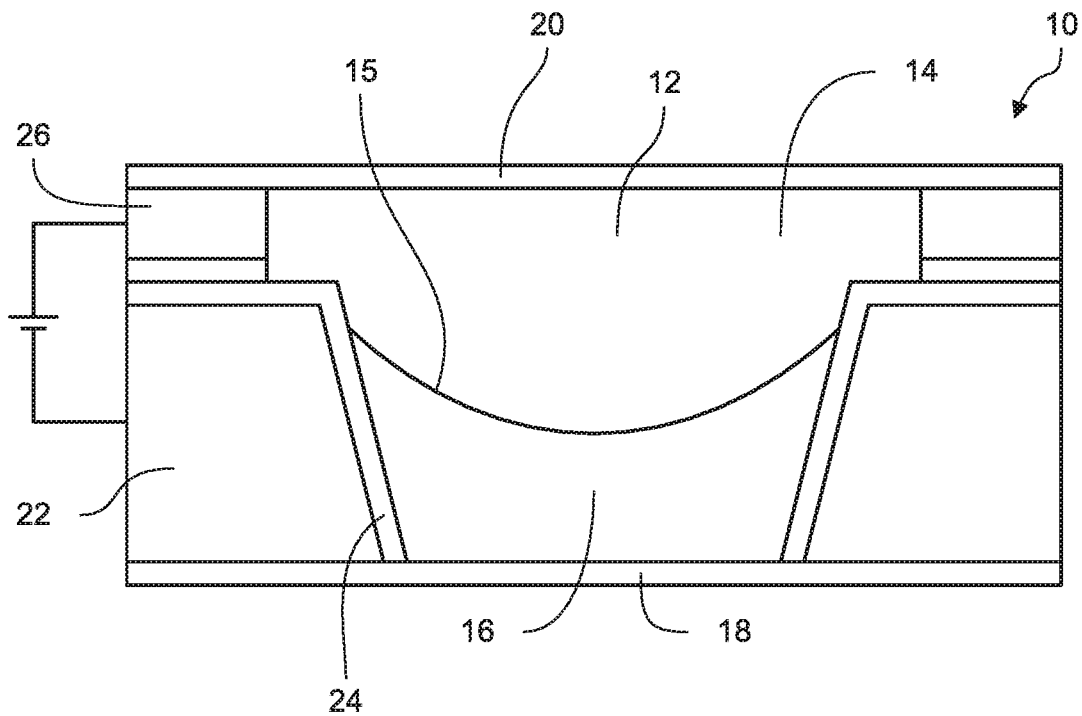
FIG. 1 is a cross-sectional view of an example embodiment of a liquid lens.

FIG. 1 is a cross-sectional view of an example embodiment of a liquid lens 10. The liquid lens 10 can have a cavity 12 that contains at least two fluids (e.g., liquids), such as a first fluid 14 and a second fluid 16. The two fluids can be substantially immiscible so that a fluid interface 15 is formed between the first fluid 14 and the second fluid 16. Although some embodiments disclosed herein have a fluid interface between two fluids that directly contact each other, the interface can be formed by a membrane or other intermediate structure or material between two fluids. Thus, various embodiments disclosed herein can be modified to use various different fluids, such as those that could mix if in direct contact. In some embodiments the two fluids 14 and 16 can be sufficiently immiscible such as to form the fluid interface 15. The interface 15, when curved for example, can refract light with optical power as a lens. The first fluid 14 can be electrically conductive, and the second fluid 16 can be electrically insulating. In some embodiments, the first fluid 14 can be a polar fluid, such as an aqueous solution. In some embodiments, the second fluid 16 can be an oil. The first fluid 14 can have a higher dielectric constant than the second fluid 16. The first fluid 14 and the second fluid 16 can have different indices of refraction, for example, so that light can be refracted at it passes through the fluid interface 15. The first fluid 14 and the second fluid 16 can have substantially similar densities, which can impede either of the fluids 14 and 16 from floating relative to the other.

The cavity 12 can include a portion having a shape of a frustum or truncated cone. The cavity 12 can have angled side walls. The cavity 12 can have a narrow portion where the side walls are closer together and a wide portion where the side walls are further apart. The narrow portion can be at the bottom end of the cavity 12 and the wide portion can be at the top end of the cavity 12 in the orientation shown, although the liquid lenses 10 disclosed herein can be positioned at various other orientations. The edge of the fluid interface 15 can contact the angled side walls of the cavity 12. The edge of the fluid interface 15 can contact the portion of the cavity 12 having the frustum or truncated cone shape. Various other cavity shapes can be used. For example, the cavity can have curved side walls (e.g., curved in the cross-sectional view of FIGS. 1-2). The side walls can conform to the shape of a portion of a sphere, toroid, or other geometric shape. In some embodiments, the cavity 12 can have a cylindrical shape. In some embodiments, the cavity can have a flat surface and the fluid interface can contact the flat surface (e.g., as a drop of the second fluid 16 sitting on the base of the cavity 12).

A lower window 18, which can include a transparent plate, can be below the cavity 12. An upper window 20, which can include a transparent plate, can be above the cavity 12. The lower window 18 can be located at or near the narrow portion of the cavity 12, and/or the upper window 20 can be located at or near the wide portion of the cavity 12. The lower window 18 and/or the upper window 20 can be configured to transmit light therethrough. The lower window 18 and/or the upper window 20 can transmit sufficient light to form an image, such as on an imaging sensor of a camera. In some cases, the lower window 18 and/or the upper window 20 can absorb and/or reflect a portion of the light that impinges thereon.

A first one or more electrodes 22 (e.g., insulated electrodes) can be insulated from the fluids 14 and 16 in the cavity 12, such as by an insulation material 24. One or more second electrodes 26 can be in electrical communication with the first fluid 14. The second one or more electrodes 26 can be in contact with the first fluid 14. In some embodiments, the second one or more electrodes 26 can be capacitively coupled to the first fluid 14. Voltages can be applied between the electrodes 22 and 26 to control the shape of the fluid interface 15 between the fluids 14 and 16, such as to vary the focal length of the liquid lens 10. Direct current (DC) voltage signals can be provided to one or both of the electrodes 22 and 26. Alternating current (AC) voltage signals can be provided to one or both of the electrodes 22 and 26. The liquid lens 10 can respond to the root mean square (RMS) voltage signal resulting from the AC voltage (s) applied. In some embodiments, AC voltage signals can impede charge from building up in the liquid lens 10, which can occur in some instances with DC voltages. In some embodiments, the first fluid 14 and/or the second one or more electrodes 26 can be grounded. In some embodiments, the first one or more electrodes 22 can be grounded. In some embodiments, voltage can be applied to either the first electrode(s) 22 or the second electrode(s) 26, but not both, to produce voltage differentials. In some embodiments, voltage signals can be applied to both the first electrode(s) 22 and the second electrode(s) 26 to produce voltage differentials.

Figure 2:
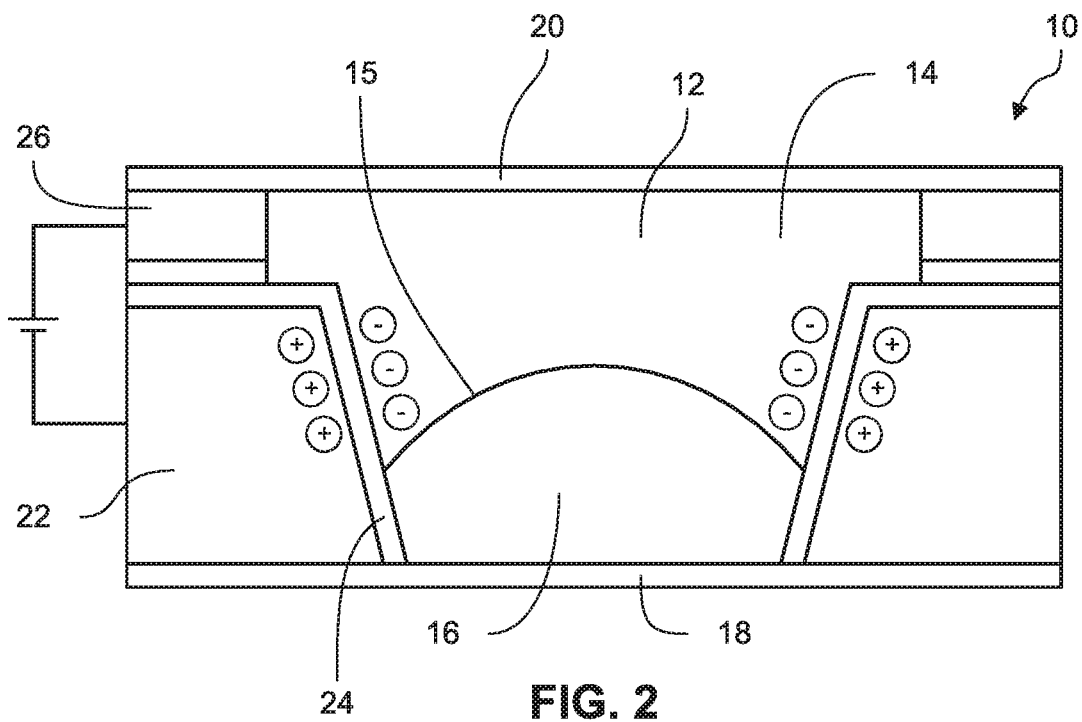
FIG. 2 shows the liquid lens in a second state where a voltage is applied.

FIG. 1 shows the liquid lens 10 in a first state where no voltage is applied between the electrodes 22 and 26, and FIG. 2 shows the liquid lens 10 in a second state where a voltage is applied between the electrodes 22 and 26. The chamber 12 can have one or more side walls made of a hydrophobic material. For example, the insulating material 24 can be parylene, which can be insulating and hydrophobic, although various other suitable materials can be used. When no voltage is applied, the hydrophobic material on the side walls can repel the first fluid 14 (e.g., an aqueous solution) so that the second fluid 16 (e.g., an oil) can cover a relatively large area of the side walls to produce the fluid interface 15 shape shown in FIG. 1. When a voltage is applied between the first electrode 22 and the first fluid 14 (e.g., via the second electrode 26), the first fluid 14 can be attracted to the first electrode 22, which can drive the location of the fluid interface 15 down the side wall so that more of the side walls are is in contact with the first fluid 14. Changing the applied voltage differential can change the contact angle between the edge of the fluid interface 15 and the surface of the cavity 12 (e.g., the angled side wall of the truncated cone portion of the cavity 12) based on the principle of electrowetting. The fluid interface 15 can be driven to various different positions by applying different amounts of voltage between the electrodes 22 and 26, which can produce different focal lengths or different amounts of optical power for the liquid lens 10.

Fluid Interface Tilt

Figure 3A:
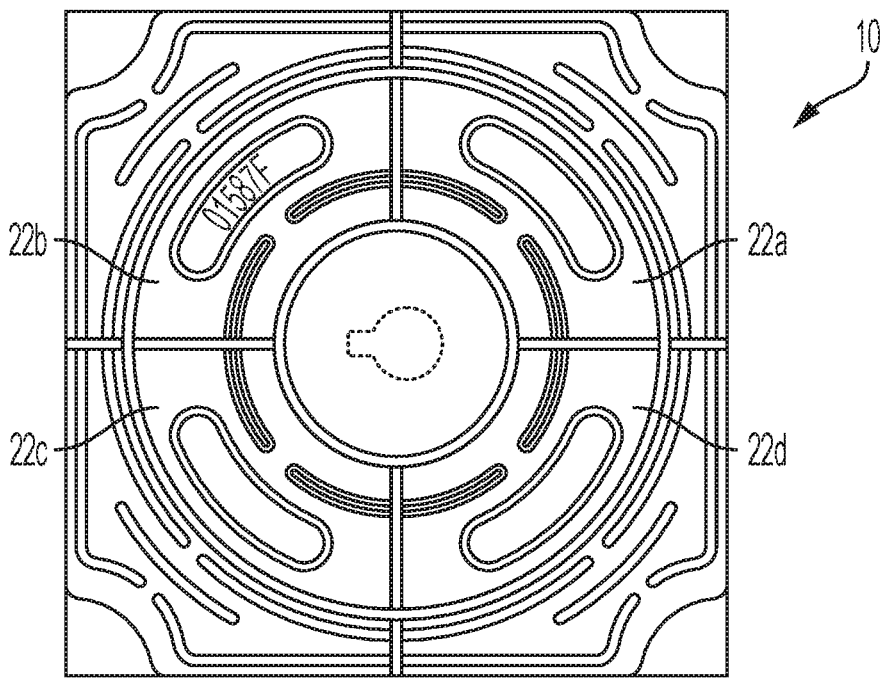
FIG. 3A shows a plan view of an example embodiment of a liquid lens.

FIG. 3A shows a plan view of an example embodiment of a liquid lens 10. In some embodiments, the first one or more electrodes 22 (e.g., insulated electrodes) can include multiple electrodes 22 positioned at multiple locations on the liquid lens 10. The liquid lens 10 can have four electrodes 22a, 22b, 22c, and 22d, which can be positioned in four quadrants of the liquid lens 10. In other embodiments, the first one or more electrodes 22 can include various numbers of electrodes (e.g., 1 electrode, 2 electrodes, 4 electrodes, 6 electrodes, 8 electrodes, 12 electrodes, 16 electrodes, 32 electrodes, or more, or any values therebetween). Although various examples are provided herein with even numbers of insulated electrodes 22, odd numbers of insulated electrodes 22 can also be used. The electrodes 22a-d can be driven independently (e.g., having the same or different voltages applied thereto), which can be used to position the fluid interface 15 at different locations on the different portions (e.g., quadrants) of the liquid lens 10. The electrodes 22 are sometimes called driving electrodes. The electrode 26 is sometimes called a common electrode.

Figure 3B:
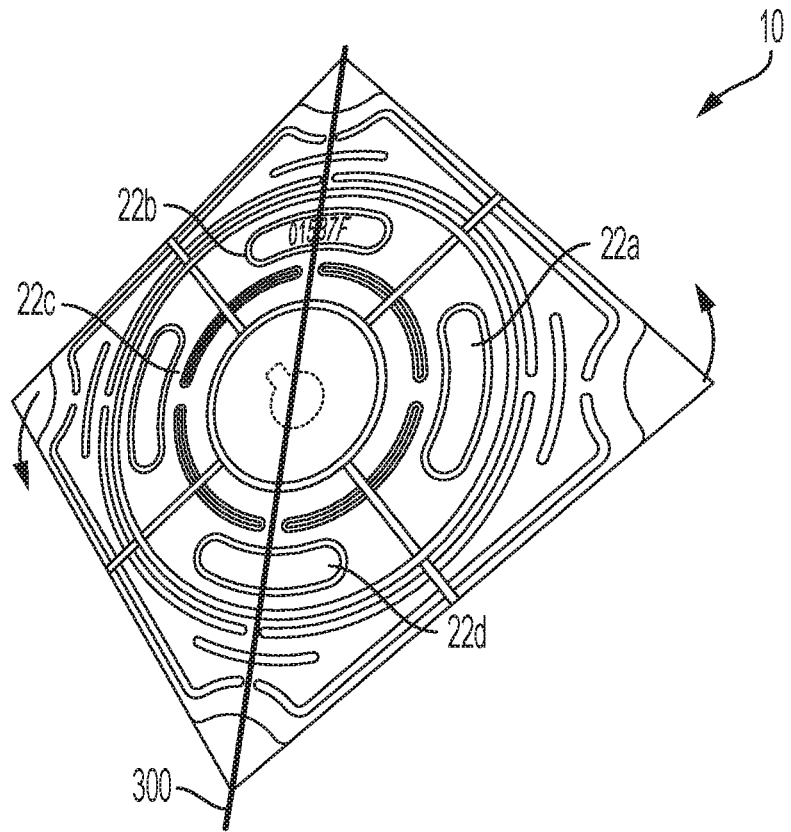
FIG. 3B shows a plan view of an example embodiment of a liquid lens being titled about an axis through two electrodes.

FIG. 3B shows the electrodes of FIG. 3A rotating about an axis 300. The direction of rotation is indicated by the arrows. To compensate for rotation (e.g., shaking) of the liquid lens 10 about the axis 300, voltages applied to the electrodes 22a and 22c can be varied, so that the fluid interface 15 moves up or down the sidewalls at the locations of the electrodes 22a and 22c. Shaking is often oscillatory, and if the liquid lens 10 were to oscillate back and forth about the axis 300, the voltages (e.g., RMS voltages) on the electrodes 22a and 22c could be oscillated (e.g., out of phase with each other) to cause the fluid interface 15 to tilt back and forth (e.g., about the axis 300) to at least partially counter the optical effect of the shaking. In the example of FIG. 3B, the voltages (e.g., RMS voltages) on the electrodes 22b and 22d can be held constant because of the orientation of the axis 300. If the tilting direction aligns across two electrodes, then the waveform can be applied to those two electrodes. If the tilting occurs about a different axis than shown in FIG. 3B, then waveforms can be applied to more (e.g., all) of the electrodes, in some cases. The amplitudes of the oscillating voltage signals applied to the electrodes 22a-d can depend on the amount of tilt, and the angle of the tilt (e.g., azimuthally).

Figure 4:
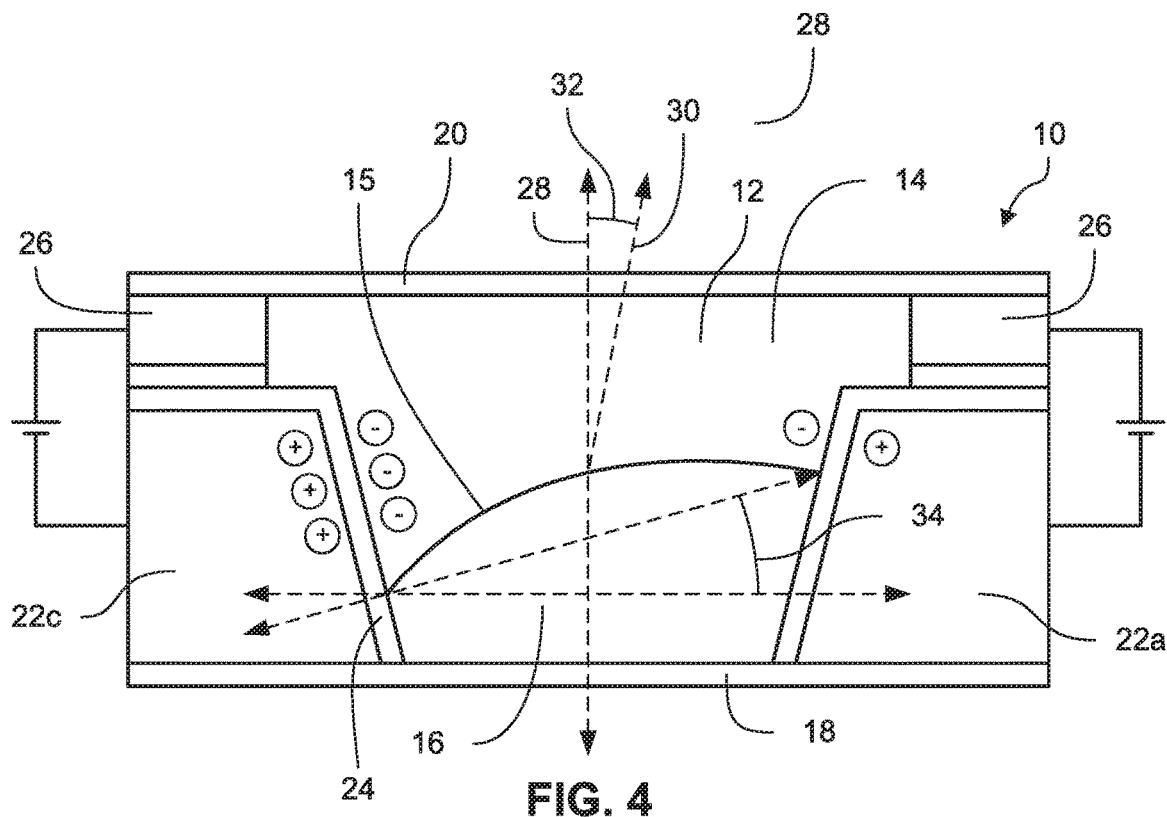
FIG. 4 shows a cross-sectional view taken through opposing electrodes.

FIG. 4 shows a cross-sectional view taken through opposing electrodes 22a and 22c. If more voltage is applied to the electrode 22c than to the electrode 22a, as shown in FIG. 4, the fluid interface 15 can be pulled further down the sidewall at the quadrant of the electrode 22c than at the quadrant of the electrode 22a.

The tilted fluid interface 15 can turn light that is transmitted through the liquid lens 10. The liquid lens 10 can have an axis 28. The axis 28 can be an axis of symmetry for at least a portion of the liquid lens 10. For example, the cavity 12 can be substantially rotationally symmetrical about the axis 28. The truncated cone portion of the cavity 12 can be substantially rotationally symmetrical about the axis 28. The axis 28 can be an optical axis of the liquid lens 10. For example, the curved and untilted fluid interface 15 can converge light towards, or diverge light away from, the axis 28. The axis 28 can be a longitudinal axis of the liquid lens 10, in some embodiments. Tilting the fluid interface 15 can turn the light 30 passing through the tilted fluid interface relative to the axis 28 by an optical tilt angle 32. The light 30 that passed through the tilted fluid interface 15 can converge towards, or diverge away from, a direction that is angled by the optical tilt angle 32 relative to the direction along which the light entered the liquid lens 10. The fluid interface 15 can be tilted by physical tilt angle 34 that produces the optical tilt angle 32. The relationship between the optical tilt angle 32 and the physical tilt angle 34 depends at least in part on the indices of refraction of the fluids 14 and 16.

The optical tilt angle 32 produced by tilting the fluid interface 15 can be used by a camera system to provide optical image stabilization, off-axis focusing, etc. In some cases different voltages can be applied to the electrodes 22a-d to compensate for forces applied to the liquid lens 10 so that the liquid lens 10 maintains on-axis focusing. Voltages can be applied to control the curvature of the fluid interface 15, to produce a desired optical power or focal length, and the tilt of the fluid interface 15, to produce a desired optical tilt (e.g., an optical tilt direction and an amount of optical tilt). Accordingly, the liquid lens 10 can be used in a camera system to produce a variable focal length while simultaneously producing optical image stabilization.

Movement of the fluid interface 15, such as during tilting of the interface 15 for off-axis focus or optical image stabilization, can produce optical aberrations, such as due to deformations in the shape of the fluid interface 15. Dynamic wavefront error can be produced by waves and other deformations produced by tilting or other movement of the fluid interface 15.

Figure 5A:
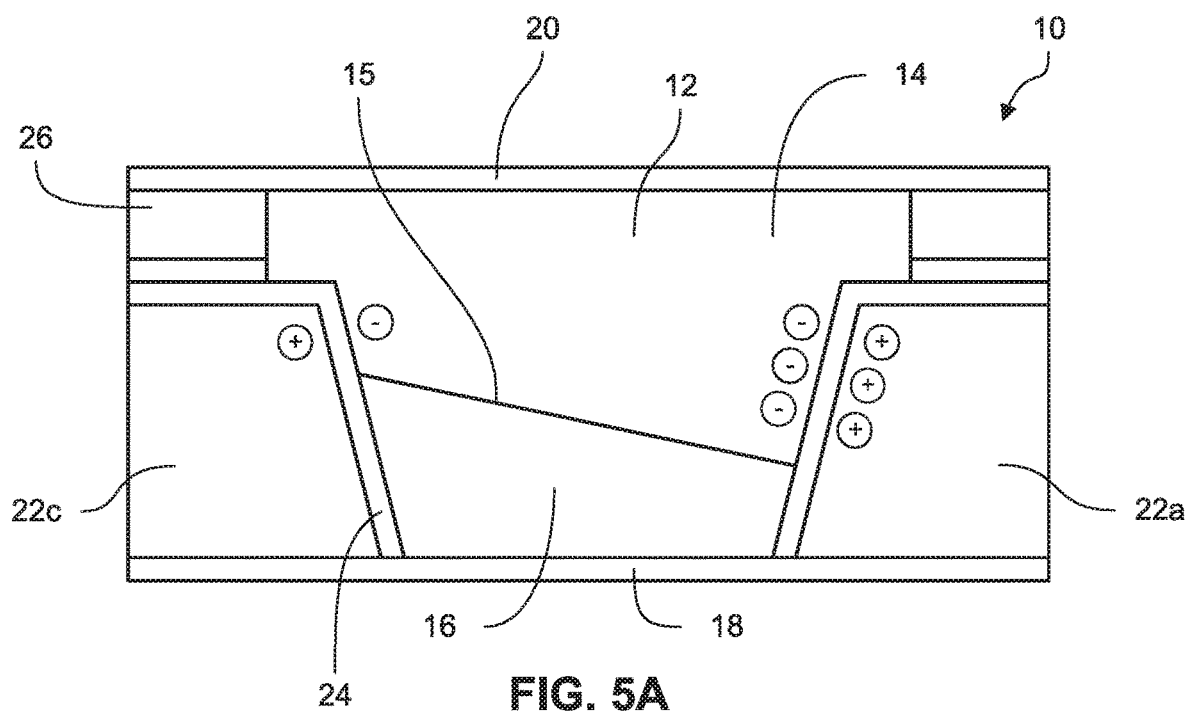
FIG. 5A-5C show cross-sectional views of an example embodiment of a liquid lens with the fluid interface at various positions.
Figure 5B:
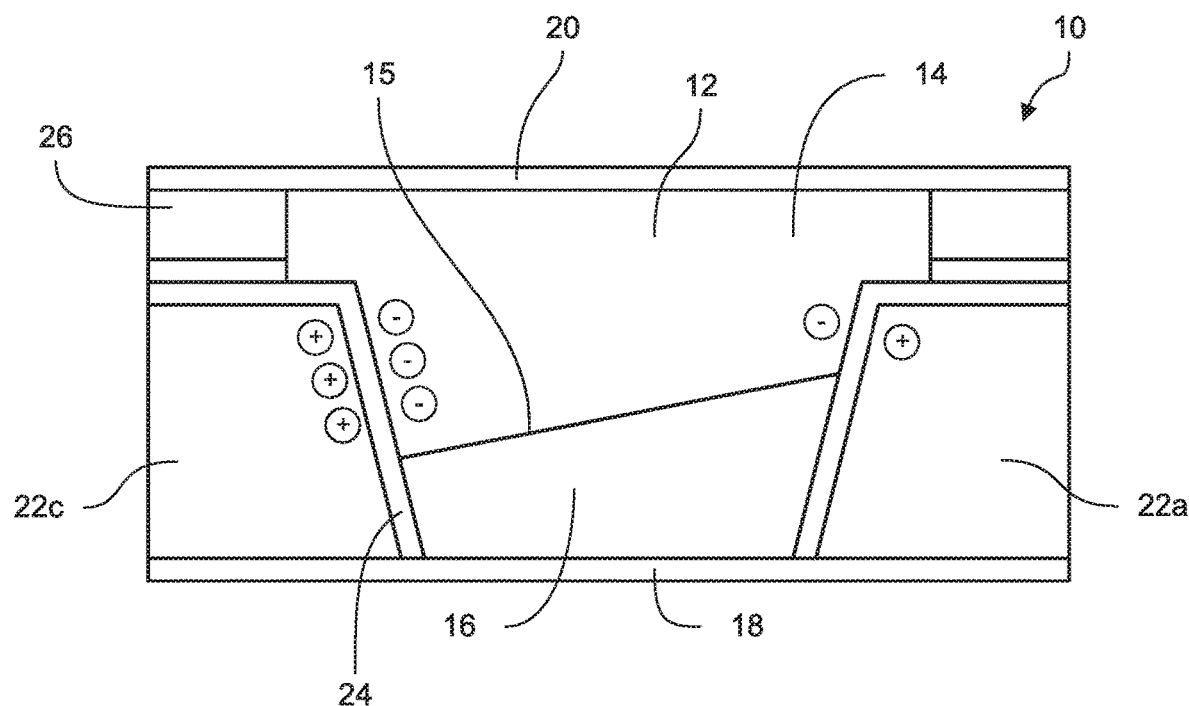

FIG. 5A is a cross-sectional view of an example embodiment of a liquid lens 10. FIG. 5A shows components similar to those described with respect to FIG. 4. In FIG. 5A the fluid interface 15 is tilted in a first direction, with the side of the fluid interface at the electrode 22a driven downward and the side of the fluid interface 15 at the electrode 22c driven upward. In FIG. 5B the fluid interface 15 is tilted in a second direction, with the side of the fluid interface at the electrode 22a driven upward and the side of the fluid interface 15 at the electrode 22c driven downward. If the liquid lens 10 is shaken back and forth about the axis 300, the voltages on the electrodes 22a and 22c can be oscillated (e.g., out of phase with each other) to tilt the fluid interface 15 back and forth between positions similar to FIGS. 5A and 5B, such as to implement optical image stabilization. Changes in the tilt angle of the interface 15 can also be used to change the focal direction, such as for off-axis imaging.

Figure 5C:
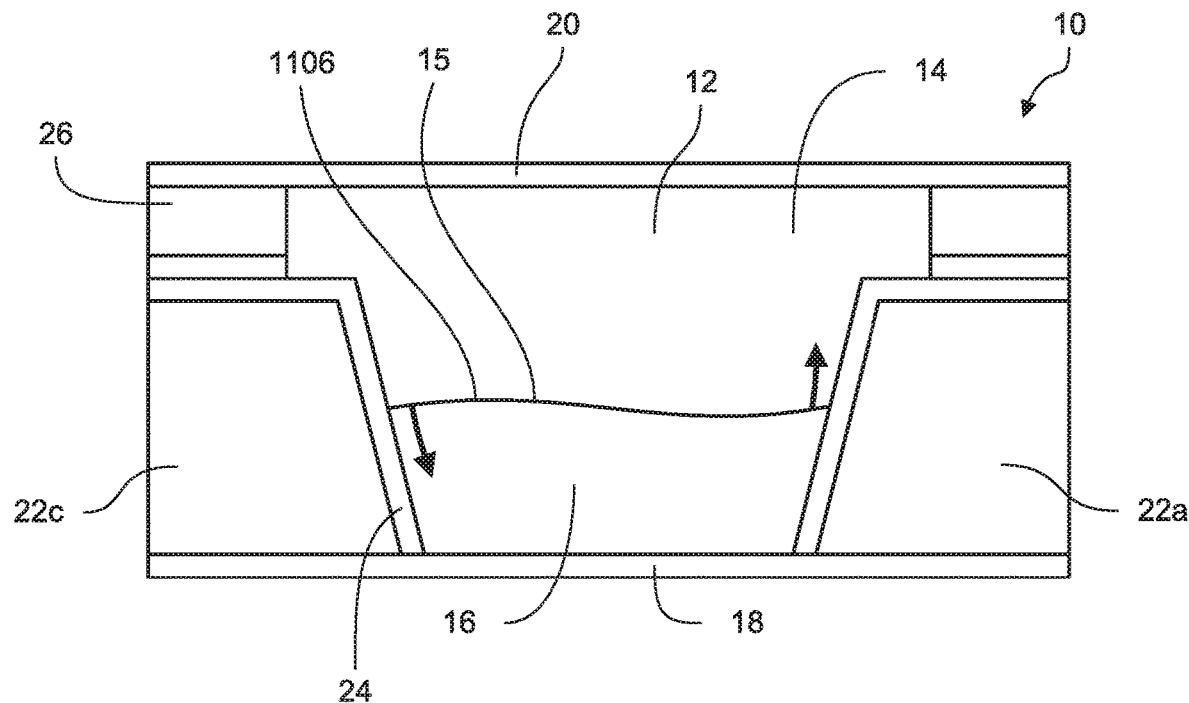

With reference to FIG. 5C, as the fluid interface 15 transitions from the position of FIG. 5A to the position of FIG. 5B, the fluids can be shifted or pumped across the cavity of the liquid lens 10. For example, some of the first fluid 14 is pushed from the right side to the left side as the fluid interface 15 is driven upward at the electrode 22a. Some of the second fluid 16 is pushed from the left side to the right side as the fluid interface 15 is driven downward at the electrode 22c. The pumping forces can deform the fluid interface 15. As can be seen in FIG. 5C, as the right side of fluid interface 15 is driven upward, a downward bulge can be formed in the right side of the fluid interface 15. As the left side of the fluid interface 15 is driven downward, an upward bulge can be formed in the left side of the fluid interface 15. Other deformations in the fluid interface 15 can be produced. Deformations in the fluid interface 15 can produce waves that propagate across the fluid interface. Bulges in the fluid interface 15 may develop as one side of the liquid experiences an upward or downward pumping pressure in response to the tilt. The pressure of the fluid can cause an opposite response (downward or upward, respectively) on the other side of the liquid. The faster the tilting occurs, the larger the bulge becomes, in some cases. For ease of illustrating the fluid interface deformations, the examples of FIGS. 5A to 5C are shown driven to a non-powered (e.g., zero diopeter) state, where the target shape of the fluid interface 15 is flat. Similar fluid interface deformations and resulting optical aberrations can be produced when the fluid interface 15 is driven to a powered state (e.g., having a curved fluid interface 15). For example, bulges where the fluid interface 15 deviates from the desired curvature can occur when the curved fluid interface 15 is tilted.

The deformations in the fluid interface 15 can produce dynamic wavefront error, such as coma. In some cases, the wavefront error (e.g., coma) can increase as the angular velocity of the tilting fluid interface 15 increases. In some cases, the dynamic wavefront error (e.g., coma) can be at a maximum near the position shown in FIG. 5C, e.g., where the fluid interface has the highest angular velocity. The dynamic wavefront error (e.g., coma) can be at a minimum near the positions shown in FIGS. 5A and 5B. As the fluid interface reaches the maximum tilt, the fluid interface 15 slows down, stops, and changes direction. This can allow the bulges or other deformations in the fluid interface 15 to diminish or settle.

The liquid lens 10 can be driven by voltage signals that are configured to reduce the deformations in the fluid interface 15, thereby reducing optical aberrations and wavefront error. In some embodiments, an oscillating signal can be superimposed onto the voltage signal that drives the fluid interface 15 up or down at one or more of the electrodes 22a-d. In some embodiments, input shaping can be performed to produce voltage signals where waves, bulges, or other disturbances produced by a first portion of the voltage signals is at least partially canceled by waves, bulges, or other disturbances produced by a second portion of the voltage signals. An input shaper can modify the voltage signals using shaping impulses, and the modified voltage signals can be configured to move the fluid interface to a tilted position with reduced deformation of the fluid interface 15, as compared to the unmodified voltage signals. In some cases, the input shaped signals can be overdriven and/or underdriven. In some cases, the signals provided to the liquid lens can improve the response time, so that the fluid interface has more time to settle, such as before images are produced using the liquid lens. In some cases, the input shaped signals can reduce oscillations, such as when the liquid lens is underdamped. This can encourage settling and reduce coma, which in some cases can result from the oscillating fluid interface in an underdamped liquid lens.

Wavefront Error Examples

Figure 6A:
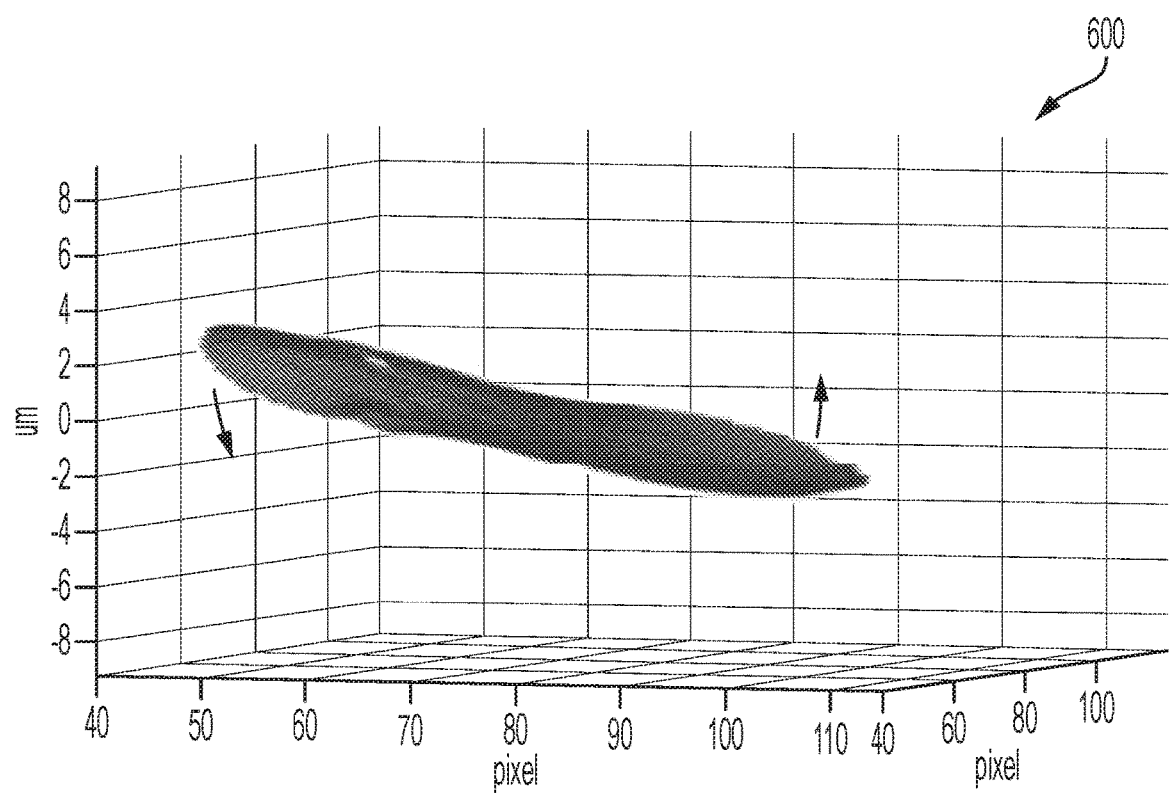
FIGS. 6A, 7A, and 8A are 3D plots of an example fluid interface at various positions.

FIG. 6A shows an example 3D plot 600 of a fluid interface that is being tilted along an x-axis in a sinusoidal tilt cycle with an amplitude of plus and minus 0.6 degrees (e.g., physical tilt) and a frequency of about 10 Hz. At about 125 degrees into the cycle, the tilt is about −0.18 degrees along the x-axis. Arrows in FIG. 6A show the direction in which the fluid interface is moving. In this example, the fluid interface is driven to be flat (e.g., a zero diopter state). However, as shown in the plot 600, the fluid interface has deformations where one side of the interface bulges upward and another side of the interface bulges downward.

Figure 6B:
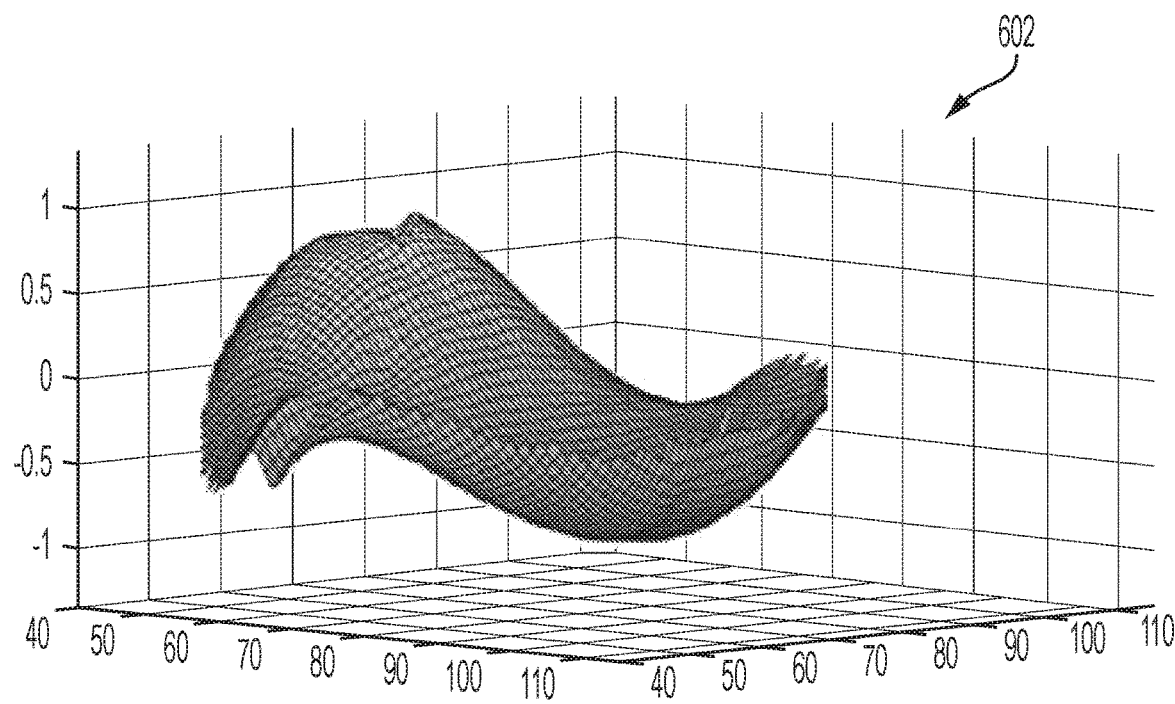
FIGS. 6B, 7B, and 8B are 3D plots of wavefront error for the fluid interface at various positions.

FIG. 6B shows an example 3D plot 602 of wavefront error for the fluid interface discussed with respect to FIG. 6A. Plot 602 shows a 3D rendering of the wavefront error at the corresponding time of the tilt cycle. In this example, coma produces about 120 nanometers of wavefront error at about 125 degrees into the cycle. Other types of wavefront error (e.g., trefoil) can also be present.

Figure 7A:
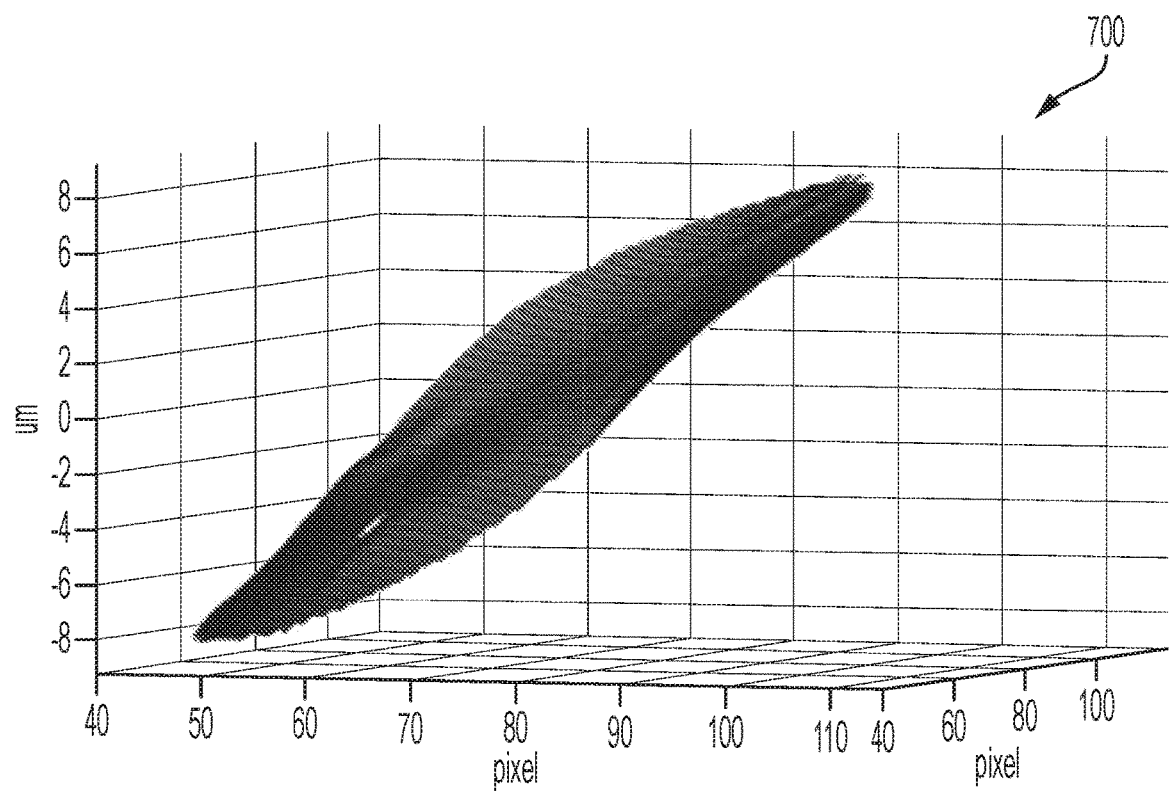

FIG. 7A shows an example 3D plot 700 of a fluid interface that is tilted along the x-axis in a sinusoidal tilt cycle with an amplitude of plus and minus 0.6 degrees and a frequency of about 10 Hz. At about 215 degrees into the cycle, the tilt is about +0.6 degrees along the x-axis. At this point, the fluid interface is nearing the maximum tilt and is moving at a slower angular velocity than in FIG. 6A. Plot 700 shows a 3D rendering of the fluid interface at the corresponding time of the tilt cycle. In this example, the fluid interface is driven to be flat (e.g., a zero diopter state). However, as shown in the graph 700, the fluid interface has deformations.

Figure 7B:
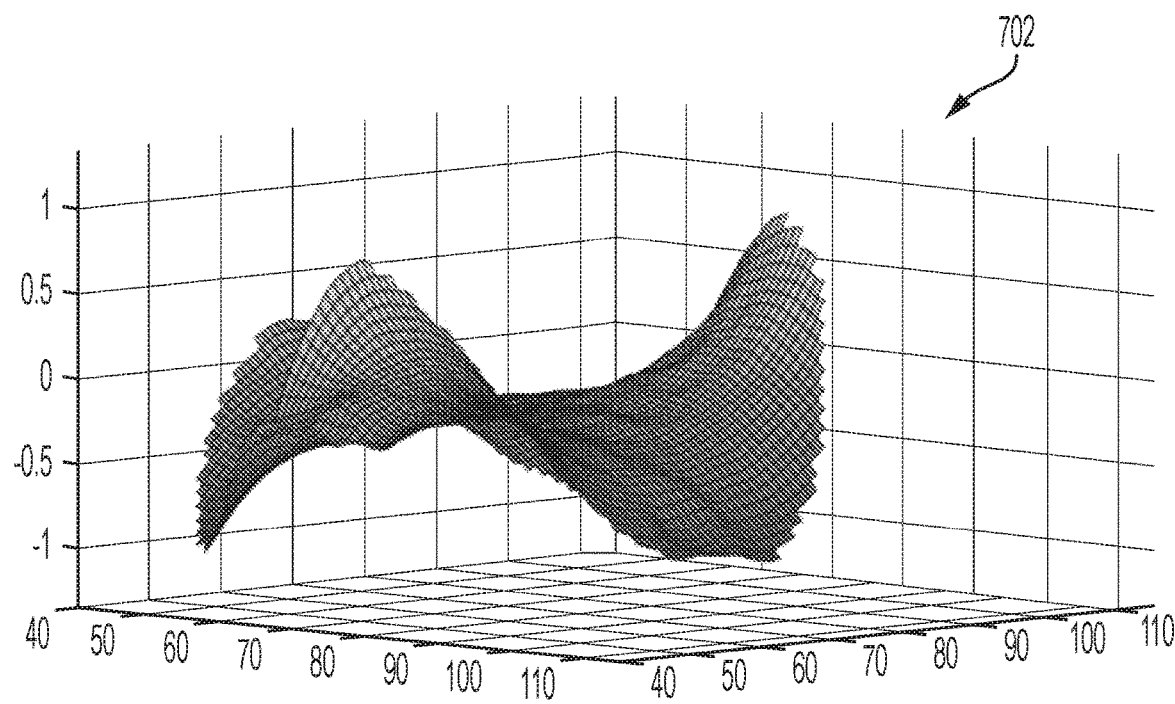

FIG. 7B shows an example 3D plot 702 of wavefront error for the fluid interface discussed with respect to FIG. 7A. Plot 702 shows a 3D rendering of the wavefront error at the corresponding time of the tilt cycle. At the position of FIG. 7A, the coma causes about no wavefront error (e.g., at about 215 degrees into the cycle), or less coma wavefront error than the moving interface of FIG. 6A. Other types of wavefront error (e.g., trefoil) are present.

Figure 8A:
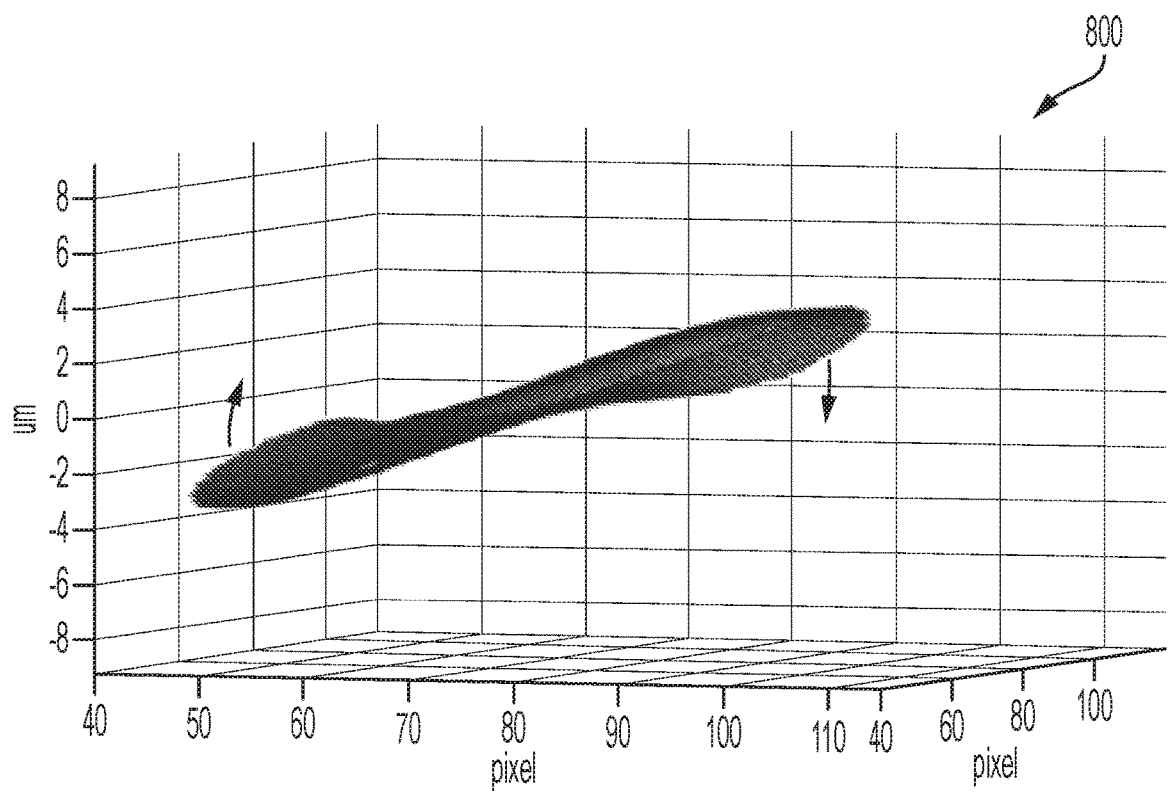

FIG. 8A shows an example 3D plot 800 of a fluid interface that is tilted along the x-axis in a sinusoidal tilt cycle with an amplitude of plus and minus 0.6 degrees and a frequency of about 10 Hz. At about 310 degrees into the cycle, the tilt is about +0.2 degrees along the x-axis. Arrows in FIG. 8A show the direction in which the fluid interface is moving. In this example, the fluid interface is driven to be flat (e.g., a zero diopter state). However, as shown in the plot 800, the fluid interface has deformations where one side of the interface bulges upward and another side of the interface bulges downward. The bulges can be on opposing sides as compared to FIG. 6A, where the fluid interface was moving in the opposite direction. The bulges can face the opposite direction as compared to FIG. 6A, where the fluid interface was moving in the opposite direction.

Figure 8B:
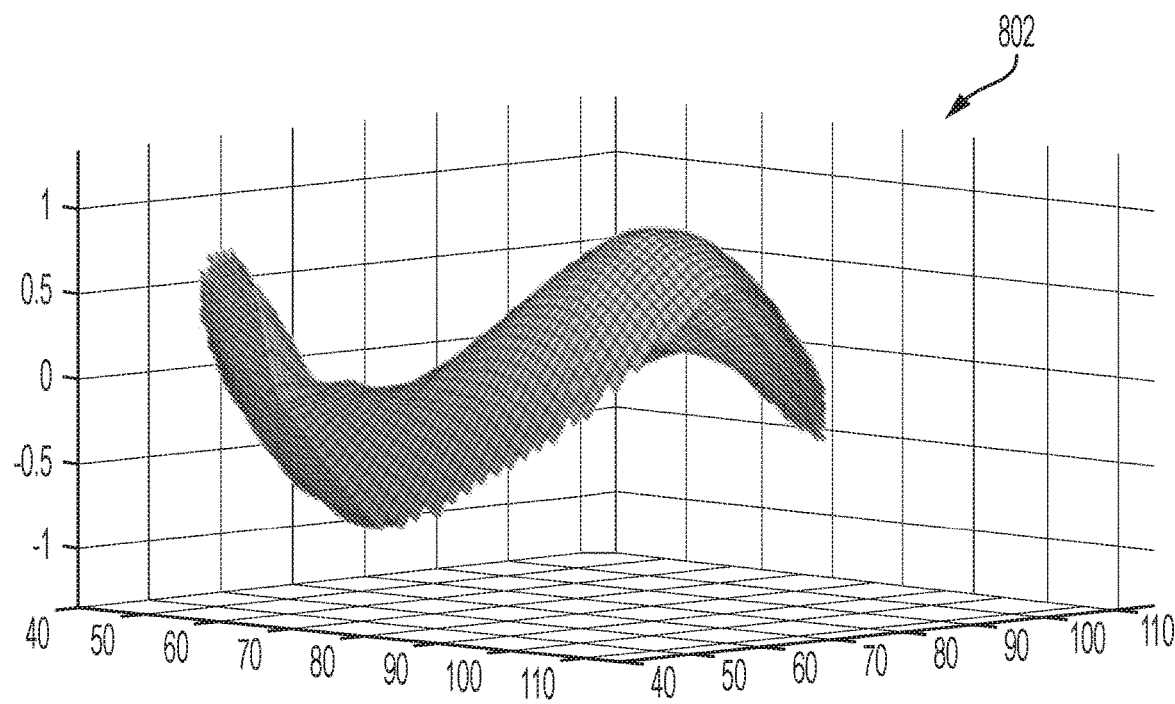

FIG. 8B shows an example 3D plot 802 of wavefront error for the same fluid interface discussed with respect to FIG. 8A. Plot 802 shows a 3D rendering of the wavefront error at the corresponding time of the tilt cycle. In this example, coma produces about −120 nanometers of wavefront error at about 310 degrees into the cycle. Other types of wavefront error (e.g., trefoil) can also be present.

Detection and Correction System

Figure 9:
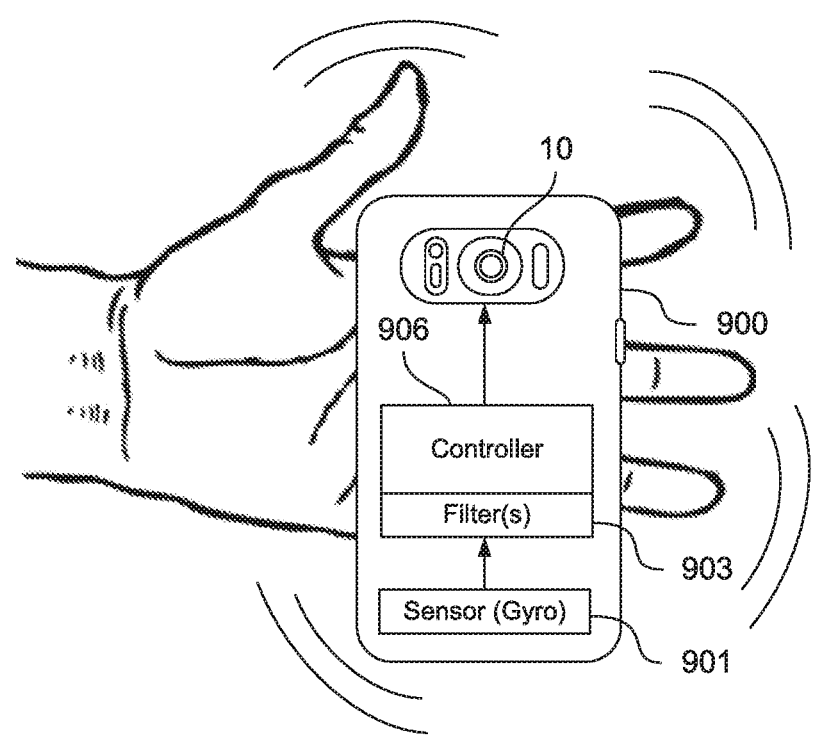
FIG. 9 shows an example camera system.

FIG. 9 shows an example camera system 900. The camera system 900 can include a liquid lens 10. The camera system 900 can also include a sensor 901, such as a gyroscope, and a controller 906 that can have one or more filters 903. Although various embodiments are discussed herein as using a gyroscope sensor, any other suitable sensor 901 can be used, such as an accelerometer. The sensor 901 can output information about the motion or orientation of the liquid lens or camera system. The sensor 901 can output angular velocity data, in some embodiments, although angular position and angular acceleration can also be used in some cases. The camera system 900 with the liquid lens 10 can be implemented, for example, in a camera, in a smartphone, in a vehicle, on an appliance, in a webcam, in a laptop, on a monitor, on a TV, in a video game console, on a drone, or in a variety of other devices. In FIG. 9, a person is holding a smartphone that includes the liquid lens 10 in the person's hand. The person's hand may not be perfectly steady. This can happen, for example, due to involuntary muscle movements and twitches, breathing, pulsing blood, etc. Tilting can happen in other applications as well. For example, a vehicle can use the camera system 900 as a backup camera or for visual input to a self-driving car system or AI driving system. The car may move when driving and may experience tilting even when the wheels are stationary due to the vibration of the engine, the movements of passengers, etc.

Tilting or shaking of the camera system 900 can degrade the images produced by the camera system 900. For example, the tilting can cause image shake in a video and/or can cause blurring in still images. The gyroscope 901 (or other sensor) can be used to detect tilting or shaking of the liquid lens 10 or camera system. The controller 906 can receive signals from the gyroscope 901 and adjust the voltage signals that are provided to the electrodes to at least partially compensate for the tilting or shaking. Accordingly, the liquid lens 10 can steadily maintain a desired focus, even in the presence of tilting or shaking.

The gyroscope 901 can generate one or more gyroscope signals indicative of tilting or other motion. For example, the gyroscope can generate an analog voltage signal that is proportional to or otherwise indicates an angular velocity (e.g., about an axis or plurality of axes) (or other type of motion). As another example, the gyroscope can generate a digital signal that encodes or otherwise indicates an angular velocity (e.g., about an axis or plurality of axes) (or other type of motion). In some cases, an analog to digital converter (e.g., which can be part of the gyroscope or any other suitable part of the camera system 900) can convert analog gyroscope signals (e.g., voltage signals) to digital gyroscope signals. One or more filters 903 can be used to filter or partially filter the gyroscope signals, such as for noise. In some embodiments, the filters 903 can be omitted.

The controller 906 can be configured to control a signal generator to generate one or more voltage signals to be applied to one or more electrodes of the liquid lens. The controller 906 can determine which voltage signals to use in order to cause the fluid interface to achieve a desired focus. The desired focus can be set, for example, by a user of the camera 900 or in response to one or more autofocus signals. The controller can adjust the one or more voltage signals based on a tilt angle, shaking, or other types of movement to achieve the desired focus.

The sensor 901 can detect tilting or shaking of the liquid lens 10. The tilting or shaking can be reported by the sensor as an angular velocity about one or more axes, as angular acceleration, and/or as angular positions, etc. The controller 906 can generate control signals for tilting the fluid interface to at least partially compensate for the tilting or shaking. In response to detection of tilting or shaking, the controller 906 can also be configured to cause the signal generator to generate one or more waveforms to reduce the dynamic wavefront error (e.g., coma) caused by the tilting. The waveforms can be applied to one or more electrodes that implement the tilting of the fluid interface to perform optical image stabilization (OIS). In some embodiments, the controller 906 can be configured to generate signals that tilt the fluid interface for off-axis focus. For example, a tilt step response can be applied to change the focal direction from a first direction to a second direction. The controller 906 can produce signals that reduce dynamic wavefront error (e.g., coma) caused by oscillating tilt signals (e.g., for OIS), or for step response signals (e.g., for off-axis focus), or for any other type of tilt. If the voltage signals are being applied to the one or more electrodes, then the waveforms can be superimposed onto the voltage signals. In some cases, the voltage signals for tilting the fluid interface can be modified by input shaping impulses. By uttering the interface with the superimposed waveforms, the dynamic wavefront error (e.g., coma) can be reduced. In some embodiments, the dynamic wavefront error (e.g., coma) can be reduced by about half.

The superimposed waveform can be a periodic waveform, an oscillating waveform, a sinusoidal waveform, a square waveform, a sawtooth waveform, a triangle waveform, or other type of waveform. The shaped voltage signal can include impulses that are sinusoidal, square waves, sawtooth waves, triangle waves, or any other suitable shape. The superimposed waveform or shaping impulses may have properties that depend on the liquids in the liquid lens and on the size and shape of the liquid lens. The fluid interface (e.g., the meniscus) may have a resonance frequency. For example, the resonance frequency can be about 25 Hz, about 30 Hz, about 35 Hz, about 40 Hz, about 45 Hz, about 50 Hz, or any value therebetween, or any range bounded by these values, although other values can be used, such as for different sizes of liquid lenses. The resonance frequency of the fluid interface can be affected by surface tension of the fluids and cavity size, and the resonance frequency can describe how quickly the fluid interface tilts back and forth (e.g., at resonance). The frequency of the superimposed waveform or of the shaping impulses can be at or below the resonance frequency of the fluid interface. For example, a sinusoidal or other suitable waveform can have a frequency approximately in the about 30 Hz to about 38 Hz range if the fluid interface has a resonant frequency of about 38 Hz.

The dynamic wavefront error (e.g., coma) can include a surface wave that can propagate across the cavity of the liquid lens. The surface wave can have a response rate, which can depend on the speed of the surface wave (which can depend on the surface tension) and the size of the cavity. The surface wave response rate can be about 200 Hz, about 225 Hz, about 250 Hz, about 275 Hz, about 300 Hz, about 325 Hz, about 350 Hz, about 375 Hz, about 400 Hz, about 425 Hz, about 450 Hz, about 475 Hz, about 500 Hz, or any values therebetween, or any ranges bounded by any combination of these values, although other values can be used in some cases. A sawtooth or triangle or sinusoidal waveform or any other suitable shape can also be used to at least partially counter the surface wave, as discussed herein. In some embodiments, the fundamental frequency of the waveform (e.g., a sawtooth or triangle or sinusoidal waveform) can be at or below the resonant frequency of the fluid interface, as discussed herein. The waveform or shaping impulses can be a composite of multiple frequencies. For example, Fourier analysis of the signal can represent the signal as a spectrum of frequencies. The frequency components can be truncated or omitted at, before, or around the response frequency of the surface wave (e.g., that produces coma error). Frequency components higher than a cutoff frequency can be omitted. The cutoff frequency can be lower than the response rate frequency of the surface wave. For example, if the frequency of the coma wave is about 350 Hz, then a threshold cutoff frequency can be set at about 300 Hz to about 325 Hz, and frequency components of the waveform above the threshold frequency can be truncated. This can impede those frequency components from constructively interfering with the surface wave (e.g. producing coma), which could worsen the wavefront error, in some cases. Accordingly, the resulting waveform or shaping impulses (e.g., sawtooth or triangle waves or other impulses) can have rounded corners due to the lack of higher frequency components. The cutoff frequency can be about 95%, about 90%, about 85%, about 80%, about 75% of the response rate of the surface wave, or any values therebetween, or any ranges bounded by these values, although other values could be used. The cutoff frequency can be about 10 Hz, about 15 Hz, about 20 Hz, about 25 Hz, about 30 Hz, about 40 Hz, about 50 Hz, about 60 Hz, about 70 Hz below the response rate of the surface wave, or any values therebetween, or any ranges bounded by any of these values, although other embodiments are possible. In some embodiments, frequency components that are within a range of the surface wave response rate can be omitted, such as within about 5%, about 10%, about 15%, about 20%, or any values therebetween or any ranges bounded therein. In some cases, frequency components that are within about 10 Hz, about 15 Hz, about 20 Hz, about 25 Hz, about 30 Hz, about 40 Hz, about 50 Hz, about 60 Hz, or about 70 Hz of the surface wave response rate can be omitted, or any values therebetween, or any ranges bounded therein. In some cases, frequency components that are higher than the surface wave response rate can be included, if they are outside the range of omission.

The controller 906 can set the amplitude of the superimposed waveform or shaping impulses based on the speed, amount, and/or direction of the fluid interface tilting. In some embodiments, the controller 906 is configured to increase the amplitude of the superimposed waveforms or shaping impulses in response to faster tilting and to reduce the amplitude of the waveforms or shaping impulses in response to slower tilting of the fluid interface. In some embodiments, the controller 906 is configured to increase the amplitude of the superimposed waveforms or shaping impulses in response to a larger amount of fluid interface tilting and to reduce the amplitude of the waveforms in response to a lesser amount of fluid interface tilting. The direction of the fluid interface tilt can affect which electrodes receive signals for tilting the fluid interface. For example, if the tilt direction aligns with the centers of two opposing electrodes, then those two opposing electrodes can receive the full amplitude of the tilting control signals. In some cases, electrodes that are orthogonal to the tilting direction do not receive tilting control signals (e.g., held at a steady state voltage, such as an RMS voltage, which can be determined by a target focal power). If the tilt direction is at an angle that is offset from the center of the two opposing electrodes, then the tilt control signals can be distributed across the electrodes to implement the tilt along the tilt direction. For example, for an offset tilt angle, the two opposing electrodes can receive tilt control signals at a reduced amplitude, as compared to the example with the tilt direction that aligns with the center of the two opposing electrodes, and the orthogonal electrodes can receive a low amplitude tilt control signal (e.g., instead of the steady state voltage). As the offset angle of the tilt direction increases, the strength or amplitude of the tilt control signals to the two opposing electrodes that lie on the tilt direction can decrease, and the strength or amplitude of the tilt control signals to the two orthogonal electrodes can increase. The amplitude of a superimposed waveform or shaping impulse for reducing wavefront error can be based at least in part on (e.g., can be proportional to) the amplitude or strength of the tilt control signal being applied to the particular electrode. More amplitude in the tilt control signal for an electrode, such as due to faster tilt, to more amount of tilt, and/or due to the tilt angle being more aligned with the electrode, can result in more amplitude in the superimposed waveform or shaping impulses. Less amplitude in the tilt control signal for an electrode, such as due to slower tilt, to less amount of tilt, and/or due to the tilt angle being less aligned with the electrode, can result in less amplitude in the superimposed waveform or shaping impulses. The amplitude of the superimposed waveform or shaping impulses applied to an electrode can be based on the voltage signal applied to the electrode. In some embodiments, the amplitude of the superimposed waveform or shaping impulses can be proportional to the voltage signal applied to the electrode. The superimposed waveform can be used as a jitter signal to reduce dynamic wavefront error (e.g., coma) and/or to reduce a bulge or other deformation in the fluid interface caused by tilting. The jitter signal, superimposed waveform, and/or shaping impulses can be applied in phase or out of phase to electrodes on different sides of the fluid interface. In some cases, the shaping impulses can be applied out-of-phase for opposing electrodes, such as by about 140 degrees, about 160 degrees, about 170 degrees, about 180 degrees, about 190 degrees, about 200 degrees, about 220 degrees. This can reduce changes to the focal length from the shaping impulses.

The controller 906 can perform input shaping (e.g., gross input shaping) on the tilt control signals. The controller 906 can determine tilt control signals configured to tilt the fluid interface. The controller 906 can determine shaping impulses based at least in part on the tilt control signals. The controller 906 can determine shaped tilt control signals based at least in part on the tilt control signals and the shaping impulses. The shaped tilt control signals can be used to drive the liquid lens. Titling the fluid interface using the shaped tilt control signals can produce less deformation, less bulging, and/or less dynamic wavefront error (e.g., coma) than would be produced using the unmodified tilt control signals. The controller 906 can determine the shaped control signals using convolution based on the tilt control signals and the shaping impulses.

Example Control Systems

Figure 10:
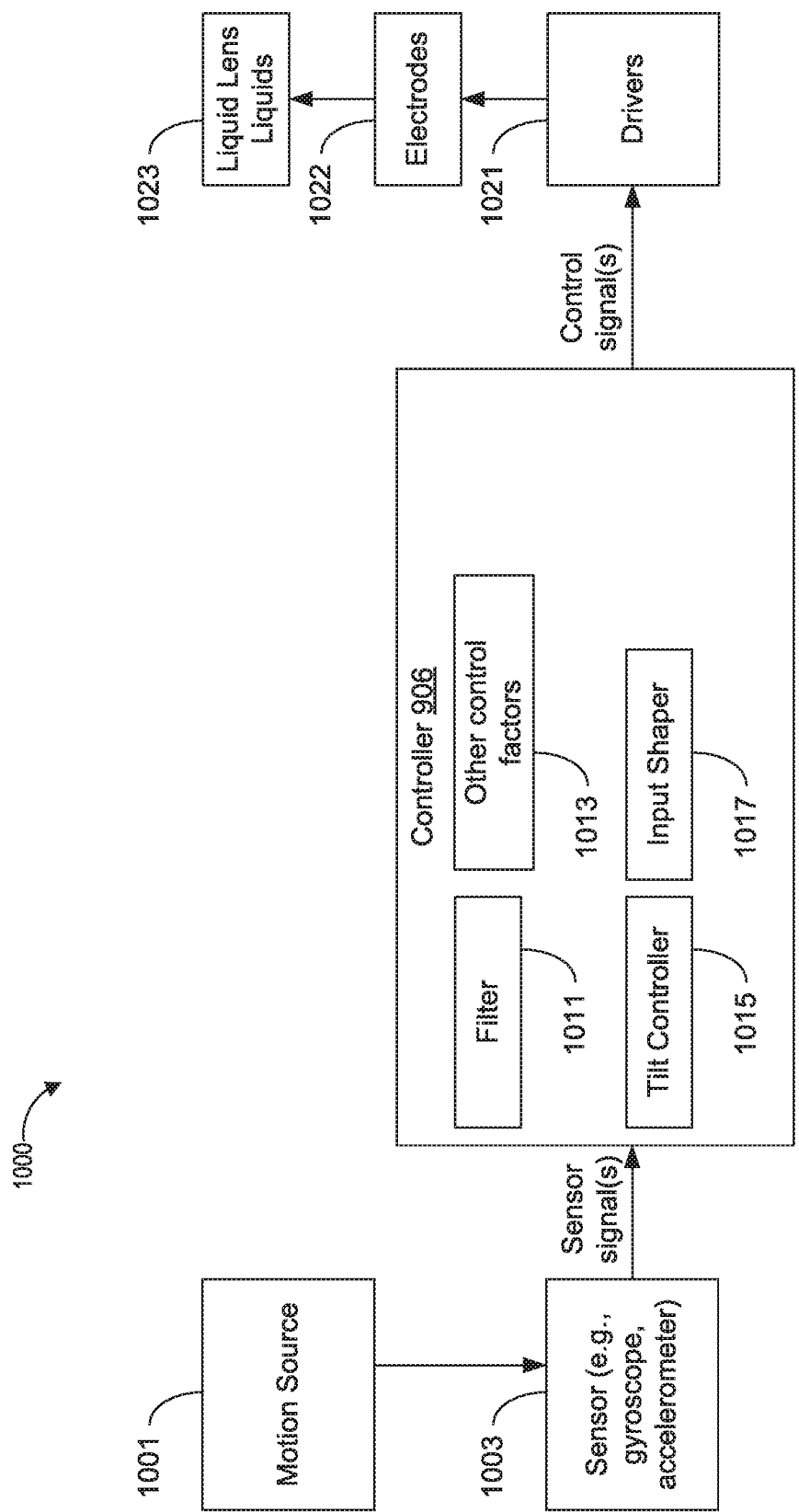
FIG. 10 shows a block diagram of an example control system.

FIG. 10 shows a block diagram of an example control system 1000, which can be used for actively canceling dynamic wavefront error (e.g., coma) in a fluid interface of a liquid lens, in some embodiments. The block diagram includes a motion source 1001, a sensor 1003 (e.g., a gyroscope, or accelerometer, or the like), a driver 1021, electrodes 1022, liquids in a liquid lens 1023, and a controller 906.

The control system 1000 can, in some embodiments, be used for controlling a liquid lens based at least in part on output signals from a sensor 1003 to perform optical image stabilization (OIS) while at least partially compensating for dynamic wavefront error (e.g., coma) caused by tilting of the fluid interface of the liquid lens 10. The control system 1000 can be used improve response time and/or improve settling time. The system 1000 can be used to drive a liquid lens to implement off-axis focusing as well as for OIS. In the control system 1000, one or more sensor signals can be transmitted to the controller 906. The sensor signals can be filtered, partially filtered, or unfiltered. In some cases, the sensor can output filtered signals. In some embodiments, the controller 906 can perform filtering on the sensor signals. In some cases, unfiltered sensor signals can be used.

The controller 906 can include or implement a filter 1011. The filter 1011 can be a weighted moving average filter, although any suitable type of filter 1011 can be used. For example, in some embodiments, the control scheme can be based on the most recent sensor signal (e.g., angular velocity ($\omega(t)$) without the previous angular velocities (e.g., the $\omega(t-1) \ldots \omega(t-n)$) to avoid processing delays. However, some embodiments may use previous angular velocities, such as to filter out instantaneous noise from the gyroscope, such as by using a weighted moving average. A first coefficient $\alpha$ can be multiplied by the most recent angular velocity $\omega(t)$. A second coefficient $\beta$ can be multiplied by a previous angular velocity $\omega(t-1)$. A third coefficient $\kappa$ can be multiplied by the previous angular velocity $\omega(t-2)$. Any number of additional previous angular velocities can be used, and can be multiplied by corresponding coefficients. The sum of the coefficients can equal 1 or 100%. The coefficients for more recent angular velocity measurements can be larger than coefficients for older angular velocity measurements.

The motion source 1001 can be any source of tilting or shaking that affects the liquid lens and/or other components of a camera system. Example sources of tilting include a person holding a camera that includes a liquid lens, wind, motions of objects that a liquid lens is mounted on, vibrations through materials that a liquid lens is coupled to, etc.

A sensor 1003 can be configured to measure tilting that is caused by the motion source 901 and affects the liquid lens liquids 1023. For example, a gyroscope can be rigidly mounted to or otherwise coupled to a liquid lens, a housing of the liquid lens, or other structure that the liquid lens is mounted on such that tilting of the liquid lens (and/or other component(s) of the camera system) can be detected by the gyroscope.

The sensor 1003 can be configured to generate one or more sensor signals indicating an angular velocity (e.g., about one or more axes or in one or more directions) or other type of data from which tilting or shaking can be calculated, such as angular position and/or angular acceleration. The sensor signals can be analog voltage signals or digital signals. The sensor 1003 can be a gyroscope. The sensor 1003 can be an accelerometer.

The controller 906 can include one or more microprocessors, digital signal processors, field programmable gate arrays, or other digital processors. The controller 906 can receive the sensor signals generated by the sensor 1003. The controller 906 can use the sensor signals to generate one or more control output signals for a driver 1021 to apply one or more voltage signals to electrodes in the liquid lens to at least partially counter the tilt or shaking while actively canceling, at least in part, dynamic wavefront error (e.g., coma) caused by tilting the fluid interface of the liquid lens. In some cases, higher frequency oscillating waveforms can be superimposed onto lower frequency base waveforms of voltage signals generated for tilting the fluid interface for optical image stabilization (OIS). In some embodiments, the base tilt voltage signals and wavefront-error-canceling waveforms can be generated by separate voltage generators and then superimposed, such as using an adder.

The controller 906 can implement a feed forward control system based on the sensor signals from the sensor 1003. The controller 906 can have or implement a tilt controller, which can determine control signals configured to tilt the fluid interface based at least in part on the sensor signals from the sensor 1003, such as to perform optical image stabilization (OIS). The controller 906 can have or implement an input shaper 1017, in some embodiments, which can modify the control signals determined by the tilt controller 1015 to reduce dynamic wavefront error (e.g., coma), improve response time, improve settling time, and/or reduce oscillations or ringing. The input shaper 1017 can determine shaped control signals. In some embodiments, the tilt controller 1015 and the input shaper 1017 can be integrated or performed together. In some cases, intermediate tilt control signals are not determined, and the system can determine the shaped control signals directly. The controller 906 can use other control factors 1013 for determining the control signals, such as a desired focal length or optical power, temperature, etc.

EXAMPLES

Figure 11:
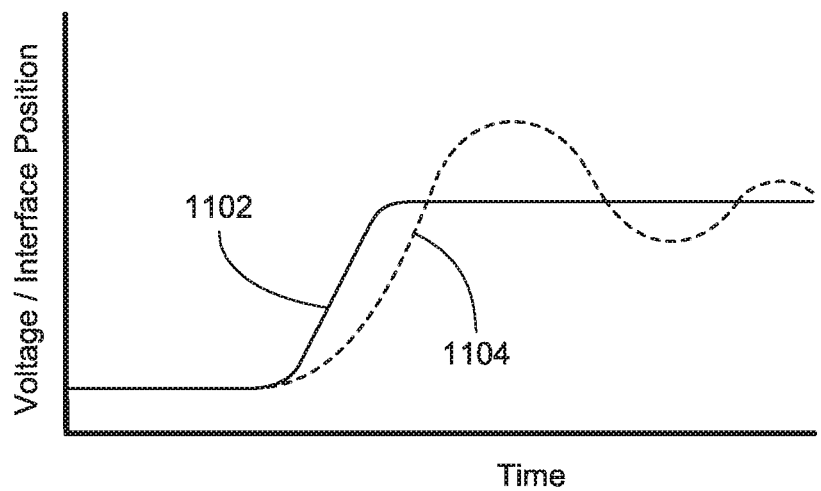
FIG. 11 shows a fluid interface response to a voltage signal without input shaping.
Figure 12:
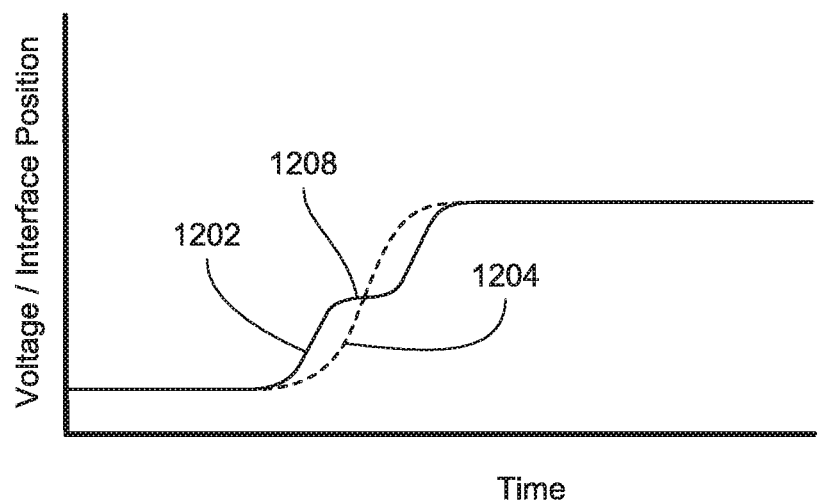
FIG. 12 shows an example of a fluid interface response to a voltage signal with input shaping.
Figure 13:
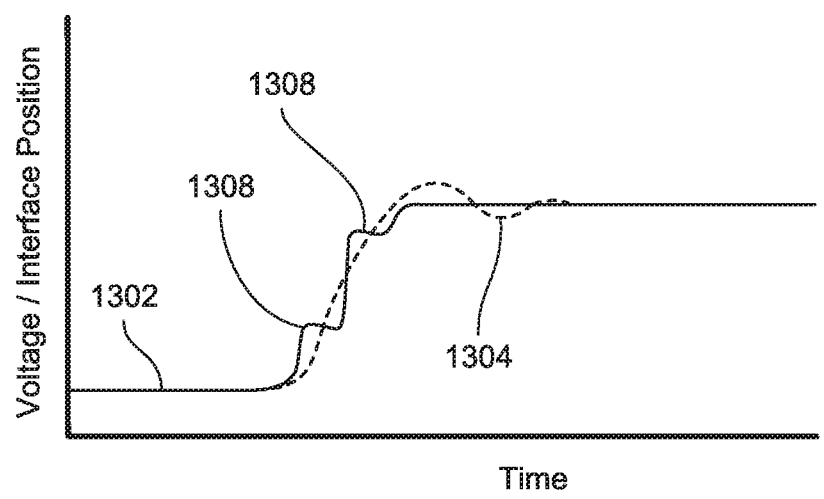
FIG. 13 shows another example of a fluid interface response to a voltage signal with input shaping.

Examples of input shaping are provided in FIG. 11 to FIG. 13. FIG. 11 is an example plot of a fluid interface being driven to a tilted position without input shaping. FIG. 12 is an example plot of a fluid interface being driven to a tilted position using input shaping. The solid line 1102 represents a voltage (e.g., an RMS voltage) applied to an electrode of a liquid lens. The voltage starts at a first, relatively low value. The first voltage is maintained for a period of time. Then the voltage is ramped up to the second, relatively high voltage value. The second voltage value is then maintained for a period of time. Raising the voltage from the first value to the second value can drive the edge of the fluid interface downward at the location of the electrode. This can cause the fluid interface to tilt. However, tilting the fluid interface can also produce waves, oscillations, or other disturbances in the fluid interface, which can result in dynamic wavefront error (e.g., coma).

The dashed line in FIG. 11 represents the position of a portion of the fluid interface that is spaced away from the edge of the fluid interface. By way of example, the portion of the fluid interface that corresponds to the dashed line of FIG. 11 can be at location 1106 in FIG. 5C. In FIG. 11, the dashed line is on top of the solid line when the portion of the fluid interface (e.g., at 1106) is at the undisturbed position dictated by the voltage of the solid line. If the fluid interface were to respond instantly with no waves, oscillations, or other disturbances, then the dashed line would remain on top of the solid line. However, as the voltage (e.g., on electrode 22c of FIG. 5C) increases and the edge of the fluid interface is driven downward, the portion 1106 of the fluid interface can lag behind. Then the portion 1106 of the fluid interface can swing past the position dictated by the second voltage value (e.g., at a time after the second voltage value has been reached). The portion 1106 of the fluid interface can oscillate back and forth until it settles at the location dictated by the second voltage value.

In FIG. 12, the solid line 1202 shows a voltage signal, similar to line 1102 of FIG. 11, and the dashed line 1204 shows the location of the portion 1106 of the fluid interface, similar to line 1104 in FIG. 11. In the example of FIG. 12, the voltage signal 1202 is a shaped voltage signal. The voltage signal of FIG. 11 can be modified, such as by the input shaper 1017, to produce the shaped voltage signal 1202, which can reduce oscillation of the fluid interface. The voltage can be at a first, relatively low value for a time, and then the voltage can start to increase (e.g., similar to FIG. 11). As the voltage 1202 increases towards the second voltage value, one or more shaping impulses 1208 can alter the voltage signal, such as so that the position of the portion 1106 of the fluid interface gets ahead of the increasing voltage signal. The changing voltage signal can transition to a constant voltage, can reverse direction, or can slow the rate of change to produce the shaping impulse 1208. Then the voltage signal 1202 can continue increasing towards the second, higher voltage value. This can have a damping effect on the position of the portion 1106 of the fluid interface. The one or more shaping impulses 1208 can be configured so that the position of the portion 1106 of the fluid interface settles at the position dictated by the second voltage value substantially without oscillating. FIG. 12 shows a single shaping impulse as the voltage transitions from the first voltage value to the second voltage value, but any suitable number of shaping impulses (e.g., 2, 3, 4, or more impulses) could be used in FIG. 12.

In the example of FIG. 12, the shaping impulse 1208 is configured to eliminate oscillation of the portion 1106 of the fluid interface. If the voltage signal is known in advance, shaping impulses can be determined (e.g., by the input shaper 1017) that can substantially eliminate oscillations. However, in some instances the tilt control voltage signals are not known in advance. For example, shaking can be partially randomized. As the voltage transitions from the first voltage towards the second voltage, at any time, changes in the shaking can cause the target voltage to change. As the voltage for an electrode is increasing in response to one or more signals from the sensor 1003 (e.g., a gyroscope), it might not be known whether the upcoming series of signals from the sensor 1003 will call for the voltage on that electrode to continue increasing at the same rate, at a faster rate, at a slower rate, or whether the voltage will need to transition to a steady state, or start decreasing. Accordingly, in some cases, it may be difficult to design the shaping impulses to completely eliminate undesired oscillations, surface waves, or dynamic wavefront error (e.g., coma).

Shaping impulses can be applied without knowing the future tilt control voltage signals in advance. An input shaping waveform can be superimposed onto the tilt control voltage signal. The input shaping waveform can have a set frequency, which can be less than the resonant frequency of the liquid lens, as discussed herein. The amplitude of the input shaping waveform can be determined based at least in part on the rate of change of the tilt control voltage signal (e.g., without the superimposed input shaping waveform). FIG. 13 shows another example of a shaped voltage signal 1302. In FIG. 13, the solid line 1302 represents a voltage signal, similar to line 1102 of FIG. 11, and the dashed line 1304 shows the location of the portion 1106 of the fluid interface, similar to line 1104 in FIG. 11. In the example of FIG. 13, the tilt control voltage signal (e.g., determined by the tilt controller 1015) can be constant for a first period of time. The input shaping waveform can have no amplitude during the first period of time because the tilt control voltage signal is not changing. Then one or more signals from the sensor 1003 can cause the tilt control voltage signal (e.g., determined by the tilt controller 1015) to start increasing. The determined tilt control voltage signal can follow line 1102 of FIG. 11. When the determined tilt control voltage is increasing, the amplitude for the input shaping waveform can be determined (e.g., proportional or otherwise based at least in part on the rate of change of the determined tilt control voltage signal). The input shaping waveform can be superimposed onto the tilt control voltage signal to produce the shaped voltage signal 1302 shown in FIG. 13. The input shaping waveform can cause portions of the shaped voltage signal 1302 to be overdriven, and/or can cause portions of the shaped voltage signal 1302 to be underdriven. For example, the shape (e.g., slope) of drive signal can cause the overdriven portions of the drive signal to be higher than the target tilt values. For example, the slope can be steeper than the slope of the target tilt angle, for some portions. The underdriven portions of the drive signal can be lesser than the target tilt values. For example, the slope can be less steep than the slope of the target tilt angle, for some portions, and in some cases, the slope can go in the opposite direction than the target tilt angle slope.

As the tilt control voltage signal is increasing, the input shaping waveform can apply shaping impulses 1308, which can impede the portion 1106 of the fluid interface from oscillating significantly. Then, in this example, one or more signals from the sensor 1003 can cause the determined tilt control voltage to level off at the second, higher voltage value. As the rate of change of the tilt control voltage signal decreases, the determined amplitude for the input shaping waveform can also decrease (e.g., proportionally). When the tilt control voltage is held constant, the input shaping waveform can have zero amplitude, and the shaped control signal 1302 can remain constant at the second voltage value. In this illustrative example, because it was not known in advance that the movement of the liquid lens (e.g., which can be partially randomized shaking) would cause the tilt control voltage signal to stop increasing at the second voltage value, the shaping impulses do not cause the portion 1106 of the fluid interface to reach the location dictated by the second voltage value without oscillation. Accordingly, some oscillation of the portion 1106 of the fluid interface is shown in FIG. 13. By comparing FIGS. 11 and 13, it can be seen that the input shaping waveform can significantly reduce oscillations even if the tilt or shaking is not known in advance (e.g., is at least partially randomized).

FIGS. 11-13 are simplified examples for illustrative purposes. In many cases the determined tilt control voltage signal does not step up from a lower steady state voltage to a higher steady state voltage. In some cases, the determined tilt control voltage signal can oscillate at various different frequencies and amplitudes. An input shaping waveform can be applied in these situations as well to reduce surface waves, bulges, and/or other undesired disturbances in the shape of the fluid interface. Applying an input shaping waveform can reduce dynamic wavefront error (e.g., coma) by about 5%, about 10%, about 15%, about 20%, about 25%, about 30%, about 35%, about 40%, about 45%, about 50%, about 55%, about 60%, about 75%, about 80%, or any values therebetween, or any ranges bounded by these values, although other values can apply in some embodiments.

Figure 14:
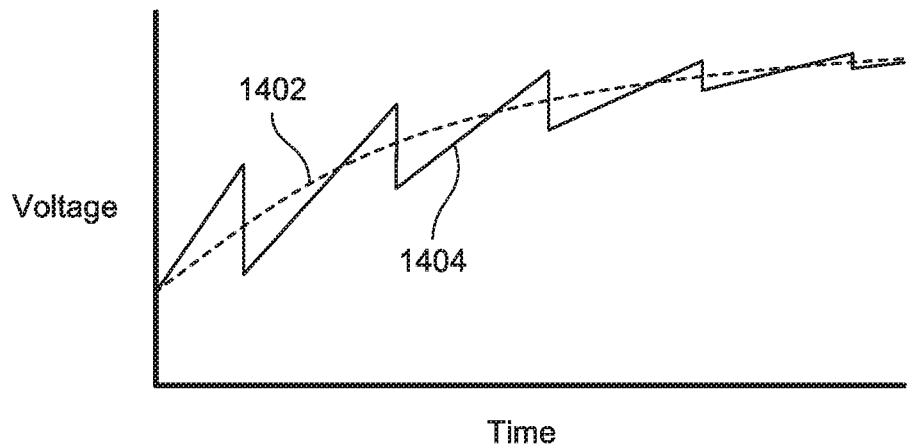
FIG. 14 is a plot of an example embodiments of a tilt control signal and a corresponding shaped control signal.

FIG. 14 is a plot an example embodiment of a shaped voltage signal. In FIG. 14, the dashed line 1402 represents a tilt control voltage signal (e.g., which can be determined by the tilt controller 1015). The solid line 1404 represents the shaped voltage signal, which can be formed by superimposing an input shaping waveform onto the tilt control voltage signal 1402, or by otherwise combining the input shaping waveform and the tilt control voltage signal 1402. The amplitude of the input shaping waveform can decrease as the rate of change of the tilt control voltage decreases (e.g., proportionally). In FIG. 14, the input shaping waveform is a sawtooth waveform. When the tilt control voltage 1402 is increasing, the sawtooth can be steeper for the decreasing voltage than for the increasing voltage. When the tilt control voltage 1402 is decreasing (not shown), the sawtooth waveform can be steeper for the increasing voltage than for the decreasing voltage. The steeper sawtooth slope can be substantially vertical, in some embodiments.

Figure 15:
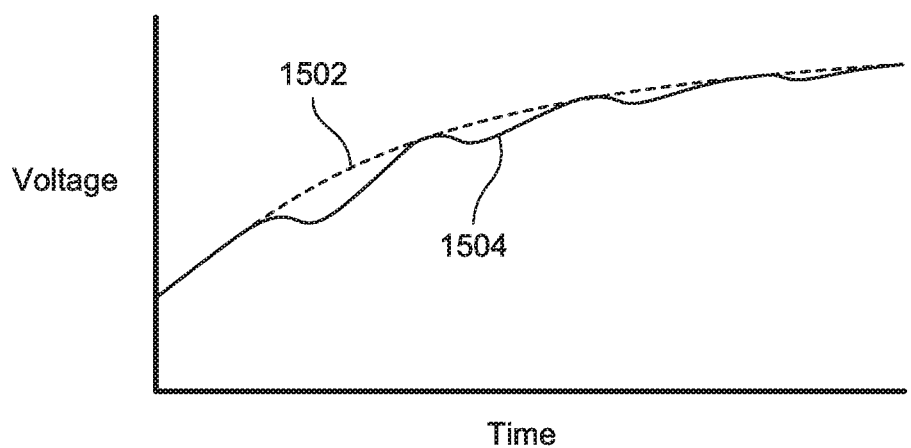
FIG. 15 is a plot of an example embodiments of a tilt control signal and a corresponding shaped control signal.

Many different input shaping waveforms can be used. With reference to FIG. 15, in some cases, the input shaping waveform, and the resulting shaped voltage signal 1504 can have rounded corners, can have a sinusoidal shape, can be a square wave, or can have any other suitable shape. As can be seen in FIG. 14, in some cases, the shaped voltage signal 1404 can straddle the tilt control voltage signal 1402. The area between the curves of the shaped voltage signal 1404 and the tilt control voltage signal 1402 can be substantially the same for the positive area (e.g., where the shaped voltage 1404 is higher than the tilt control voltage 1402) and the negative area (e.g., where the tilt control voltage 1402 is higher than the shaped voltage 1404). The positive and negative areas under the curve can vary by about 0%, about 5%, about 10%, about 15%, about 20%, about 25%, about 30%, or any values therebetween, or any ranges bounded therein. In some cases, the voltages of the shaped voltage 1504 can be less than the tilt control voltage 1502, as can be seen in FIG. 15. Various different shapes and types of shaping impulses can be used. Shaping impulses can be voltages (e.g., voltage changes) applied to an electrode, where the voltages are counter to the fluid interface motion dictated by the sensor signals. For example, when the sensor signals indicate that a side of the fluid interface should move downward, which would be accomplished by increasing the voltage to a corresponding electrode, the shaping impulses can cause the voltage to that electrode to increase, hold at a constant value, slow the rate of voltage decrease, etc. In some embodiments, an oscillating waveform can be superimposed over the entire driving signals provided to the electrodes. The amplitude can be constant, which can reduce processing time. The oscillating waveform can be applied even when the fluid interface is not tilting. This can produce small waves or other disturbances in the fluid interface, but the amplitude can be selected to be sufficiently low that the small waves do not seriously increase wavefront error. The oscillating waveform can have the benefit of reducing dynamic wavefront error, because the oscillating waveform can operate at shaping impulses, similar to the discussion herein. Accordingly, the reduction in dynamic wavefront error that can be achieved using the constant oscillating waveform (e.g., sawtooth, sinusoidal, or any other suitable shape) can justify or outweigh the minor increase in wavefront error that is caused by the constant oscillating signal when the fluid interface is not moving.

Figure 16:
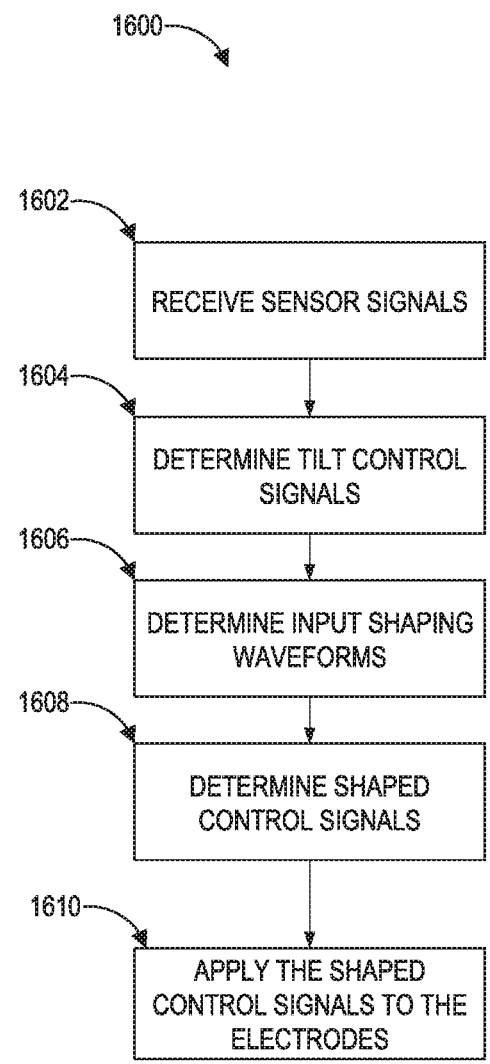
FIG. 16 shows a flowchart for an example method for optical image stabilization with improved optical quality.

FIG. 16 is a flowchart for an example embodiment of a method 1600 for driving a liquid lens. At block 1602 the controller can receive sensor signals, such as from a gyroscope or other sensor. The sensor signals can be indicative of movement and/or orientation of the liquid lens. The sensor signals can include angular velocity measurements. The sensor signals can be filtered in some cases, although unfiltered sensor signals can be used in other embodiments. At block 1604, the controller can determine tilt control signals for the electrodes of the liquid lens. Lookup tables, algorithms, formulas, or the like can be used to determine the tilt control signals based on the sensor signals received. Different tilt control signals can be determined for the different electrodes of the liquid lens.

At block 1606, the controller can determine input shaping waveforms for the electrodes. The input shaping waveforms can be determined based at least in part on the tilt control signals for the respective electrodes. In some cases, different waveform shapes are available, such as a sawtooth wave, a square wave, a sinusoidal wave, or any other suitable waveform shape. The controller can select the wave form shape, based at least in part on the tilt control signal. For example, the direction of a sawtooth waveform can depend on whether the tilt control voltage is increasing or decreasing. The amplitude of the input shaping waveform can be determined, and can in some embodiments be proportional to the rate of change of the tilt control voltage, although the amplitude can be determined in any other suitable manner. The amplitude of the input shaping waveform can be increased for higher angular velocities and decreased for lower angular velocities (e.g., measured by the sensor). The frequencies and/or phases of the input shaping waveforms can be determined, such as based at least in part on the tilt control signals. In some cases, the frequency can be a predetermined set frequency. Although the frequency of the input shaping waveform can be determined based on the frequency of the motion represented by the sensor signals. For example, higher frequency shaking can use a higher frequency input shaping waveform, and vice versa. The phase can depend on past signals. For example, if the liquid lens were held still for a time and then new motion was detected, the phase of the input shaping waveform can be selected to let the fluid interface move for a time before applying a shaping impulse. Changes in tilt direction, or other events, can cause the control to reset or alter the phase of the input shaping waveform.

At block 1608 the shaped control signals can be determined for the electrodes. For example, the controller can combine the tilt control signals and the corresponding input shaping waveforms. The input shaping waveform can be superimposed onto the tilt control signal. In some cases, the input shaping waveform and/or the shaped control signals can be a composite of multiple frequency components, and some frequency components can be omitted, such as frequency components near the surface wave response rate of the liquid lens. The controller can perform the combinations and generate control signals for implementing the shaped voltage signals. In some cases, the shaped control signals can be determined directly based at least in part on the sensor signals, such as without separately determining the tilt control signals and the input shaping waveforms. For example, lookup tables, formulas, or equations can be used to determine the shaped control signals (e.g., voltages). At block 1610 the shaped voltage signals can be applied to the electrodes of the liquid lens. In some cases, tilt control signals and input shaping waveform signals can be sent to one or more drivers. The drivers can produce tilt control voltage signals and input shaping voltage signals, which can be aggregated and delivered to the electrodes of the liquid lens. Other factors and/or inputs can also affect the voltages applied to the electrodes. For example, a target focal length or optical power can influence the voltages signals. The voltages shown and discussed can be RMS voltages. The voltages can be implemented using modulation of a higher frequency signal (e.g., about 1 kHz, about 2 kHz, about 3 kHz, about 5 kHz, about 7 kHz, about 10 kHz, or any values therebetween, or any ranges bounded thereby, or any other suitable rate), such as using PWM, pulse amplitude modulation, and the like. AC or DC voltages can be used.

Figure 17:
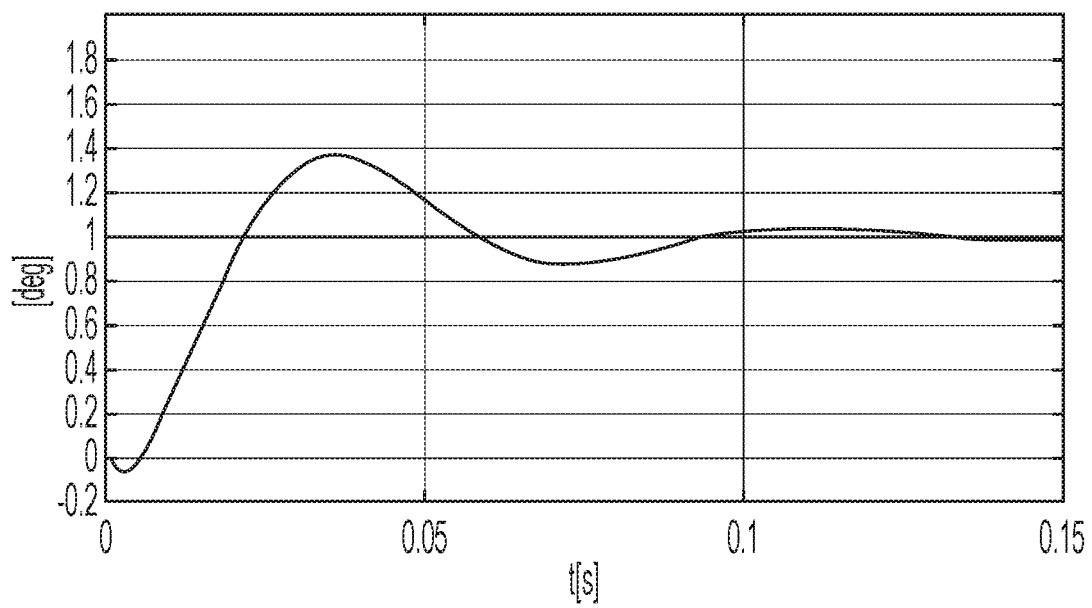
FIG. 17 shows an example tilt response to a step input.

FIG. 17 shows an example of step tilt response. At time 0, the target tilt can change from 0 degrees to 1 degree. The drive signals can change from the voltages associated with 0 degrees tilt to the voltages associated with 1 degree of tilt at time 0. The drive signals can change as a step response. A square waveform can be used, in some embodiments. The liquid lens system can be underdamped in some implementations. The interface tilt position can change from 0 degrees tilt to 1 degrees tilt. In some cases, the interface tilt position can overshoot target tilt angle (1 degrees in this example). The interface tilt position can oscillate (e.g., about the target tilt angle), and eventually settle. Dynamic wavefront error (e.g., coma) can be produced by the movement (e.g., tilting) of the interface, such as during the initial transition, the overshoot, and the oscillations. Coma can be reduced by making the interface settle faster, and/or by reducing the overshoot, for example.

Figure 18:
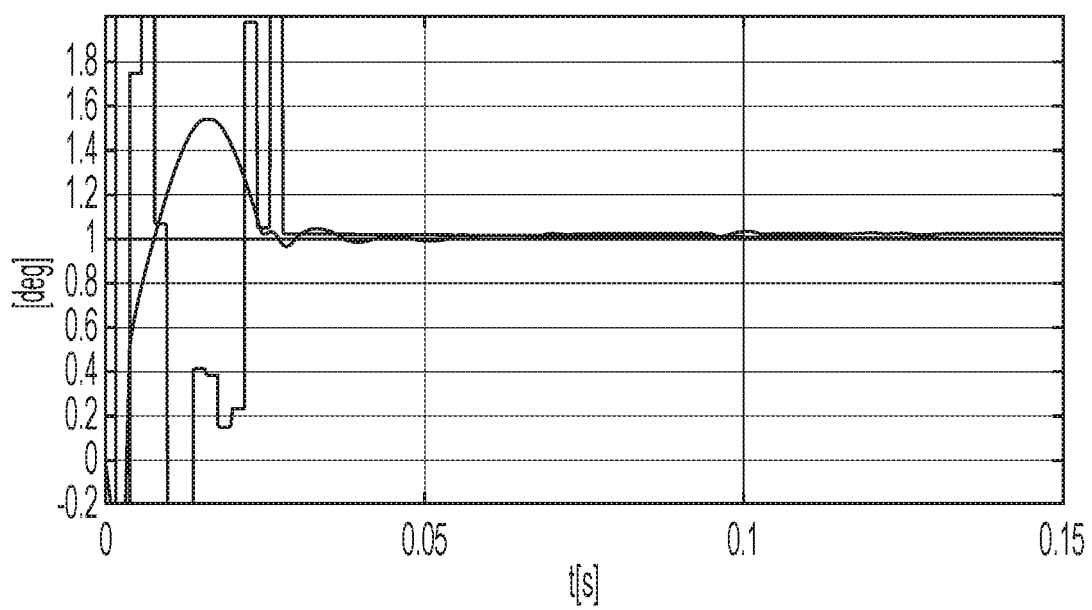
FIG. 18 shows an example input shaped drive signal and tilt response for a step input.

FIG. 18 shows an example of an input shaped tilt step response. In FIG. 18, the target tilt changes from 0 degrees to 1 degree at time 0, similar to FIG. 17. However, in FIG. 18, the drive signals are driven to an overdrive value so that the fluid interface ramps up from 0 degrees towards 1 degree of tilt more quickly. Then the drive signal is underdriven to limit the amount of overshoot. Then the drive signal can be transitioned between overdriven and underdriven states to at least partially counter oscillations in the fluid interface, to accelerate the settling, which can reduce dynamic wavefront error (e.g., coma). In FIGS. 17 and 18, the initial dip in the fluid interface tilt response can be caused by a surface wave, which can result from shocking the interface (e.g., with a step input).

Figure 19:
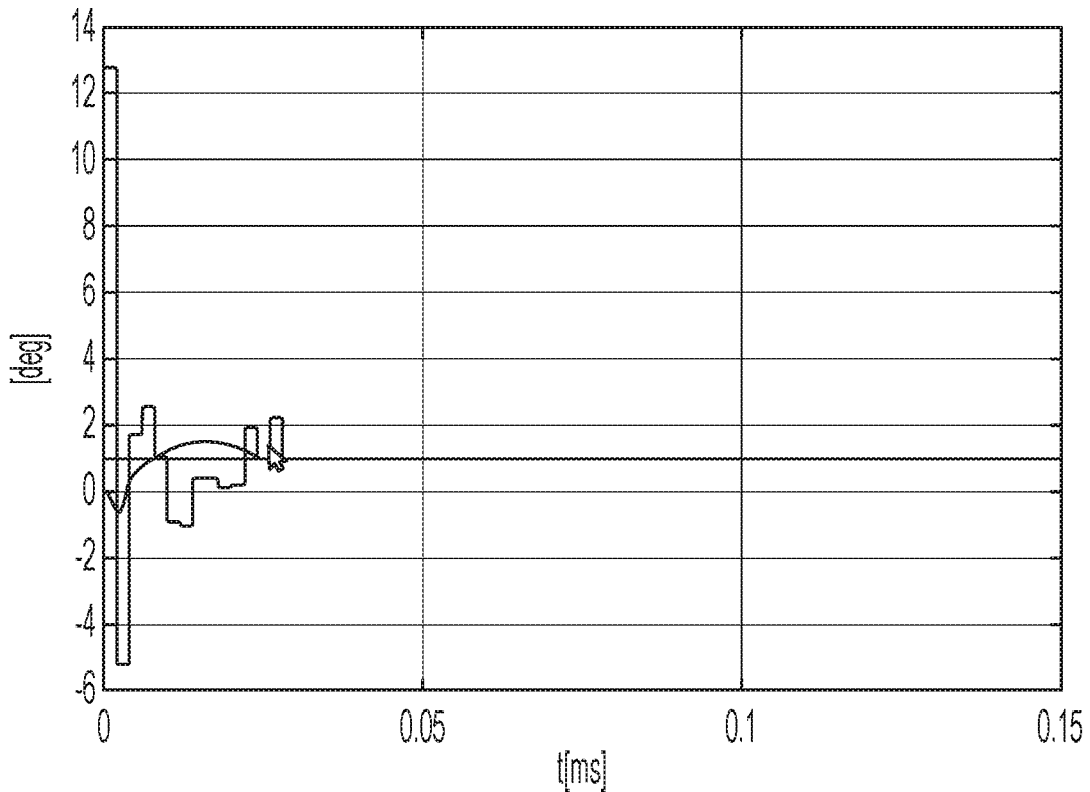
FIG. 19 shows the example of FIG. 18 with a zoomed out plot.

FIG. 19 is the same as FIG. 18, only zoomed out to show more range. In this example, the drive signal is overdriven to values associated with a tilt of about 13 degrees, then underdriven to values associated with a tilt of about −5 degrees. The drive signal can be oscillated opposite of the oscillations of the fluid interface, in some cases, which can speed up the settling time. Many variations are possible. The initial overdriven state could be overdriven by a lesser degree or by more than shown in FIGS. 18 and 19. In some cases, less overdrive can reduce the initial overshoot, but can slow down the response, which can cause the fluid interface to take longer to settle. The particular input shaping signals and overdrive/underdrive values can vary depending on the parameters of the liquid lens and/or the desired performance. For example, in some instance the dynamic wavefront error after a threshold time (e.g., 0.75 seconds) can be minimized by using a strong overdrive, causing a relatively high and early overshoot, but then providing more time of the interface to settle after the overshoot. In some cases, less, or no overdrive, can be applied, and coma can be reduced by making the overshoot smaller or omitted entirely.

Input shaped signals can also be applied to oscillating (e.g., sinusoidal) tilt signals, such as for OIS. There can be some delay in the response of the liquid lens interface, which for oscillating input signals, can result in phase delay between the drive signals and the fluid interface position. Phase delay can be problematic for OIS, because it can degrade the effectiveness of the OIS functionality, and could even exacerbate the image movement from shaking or other movement of the liquid lens. For example, if the response were 180 degrees out of phase with the input and command, then the OIS operation would compound the tilting rather than countering it.

Figure 20:
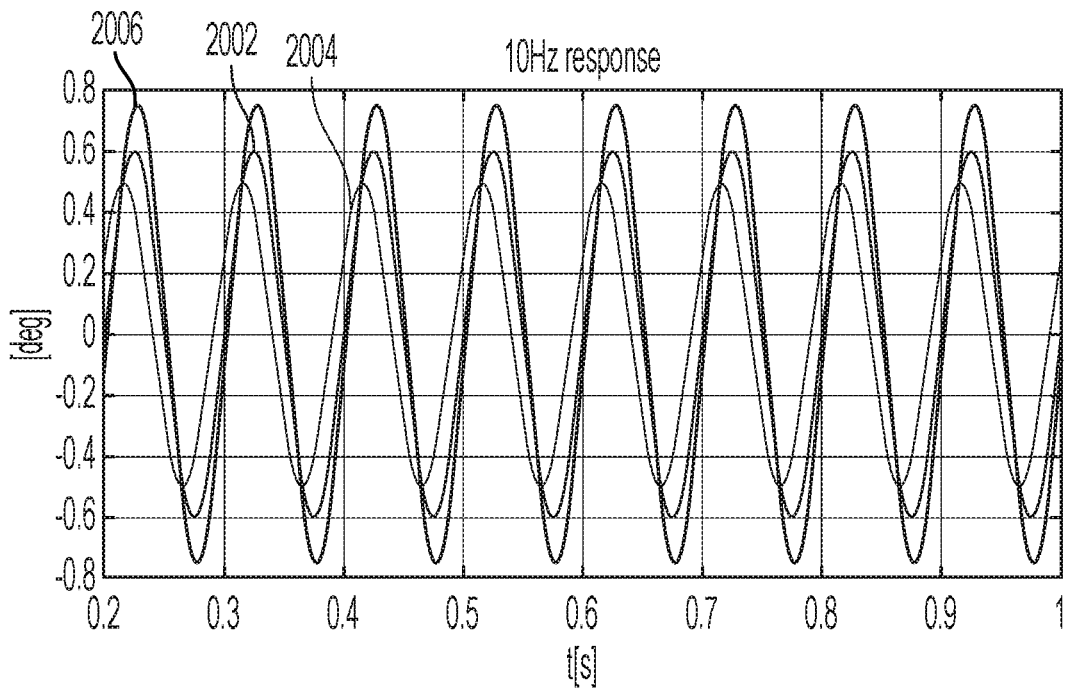
FIG. 20 shows an example of an oscillating input signal, command signal, and tilt response.

In FIG. 20, 2002 represents the input (e.g., from gyroscope or other motion or orientation sensor). 2004 represents the drive signals provided to the liquid lens. 2006 represents the tilt response of the fluid interface. In FIG. 20, the drive signals precede the tilt response by a phase delay amount. For OIS, it can be beneficial for the tilt response to align with the input 2002, which can represent movement (e.g., shaking) of the liquid lens. Accordingly, in some cases, the drive signals 2004 would need to precede the input signals that they are responding to. If the oscillating tilt signals are sufficiently regular and repetitious (e.g., like in FIG. 20), the drive signals can merely be delayed so that the tilt response substantially aligns with the next tilt oscillation. For example, if there were 30 degrees of phase delay between the drive signals and the tilt response of the interface, then the controller could delay the drive signals for 330 degrees of phase delay, so that the interface tilt response aligns sufficiently with the next tilt oscillation.

In some embodiments, the drive signals can be effectively phase shifted to be ahead of the input tilt signals. It may not be possible, in some cases, to know what the future input tilt signals will be, so in some cases, the drive signals cannot be directly phase shifted to come before the input signals. However, in some embodiments, a phase gain filter can be applied to effectively phase shift the command signals, and the associated liquid lens tilt response.

Figure 21:
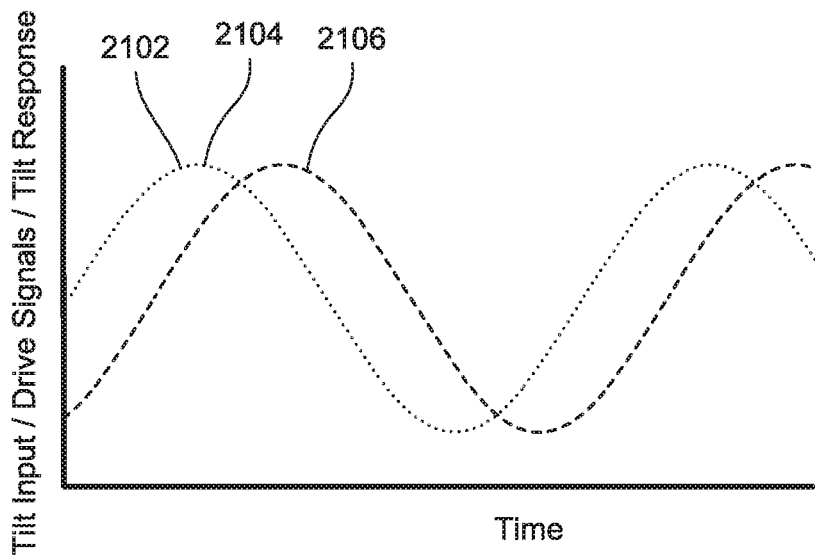
FIG. 21 shows an example of an oscillating input signal, command, and phase delayed tilt response.

FIG. 21 shows an example in which 2102 represents an oscillating shake signal, such as can be received from a gyroscope or other suitable sensor. The drive signals can be determined and delivered to the liquid lens, with practically no significant phase delay. Accordingly, in FIG. 21, lines 2102 and 2104 can lie on top of each other. Line 2106 represents the associated tilt response from the liquid lens. As can be seen in FIG. 21, the tilt response 2106 can be phase delayed relative to the input 2102 and the command signals 2104.

Figure 22:
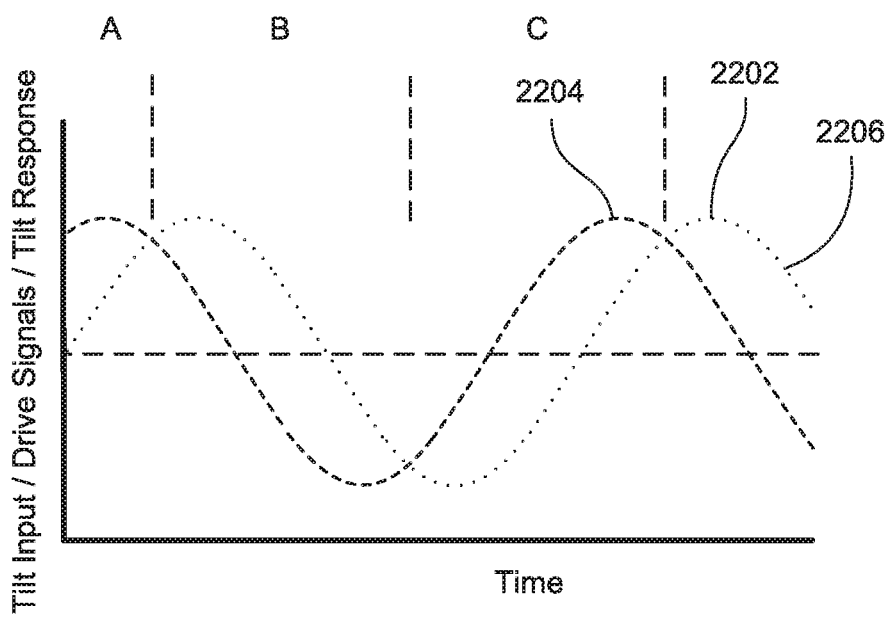
FIG. 22 shows an example of an oscillating input signal, effectively phase shifted command signal, and associated tilt response.

In FIG. 22, the same tilt input signals can be provided as those of FIG. 21. However, in the example of FIG. 22, the drive signals 2204 can be effectively phase shifted earlier than the input signals 2202, which can cause the actual interface tilt response 2206 to better align with the tilt input signals 2202 (and the associated shaking or other motion of the liquid lens). In the example of FIG. 22, the tilt response line 2206 can lie on top of the input signal line 2202. By way of example, positive gain can be applied during section A of FIG. 22. When the tilt input starts increasing, the controller can apply a positive gain so that the drive signals start at values associated with a more tilted value. As the tilt input increases, the positive gain can increase and decrease. At the transition between sections A and B, a drive signal with no gain can be applied. During section B, negative gain (e.g., attenuation) can be applied. Accordingly, during section B, the drive signals can be used that are associated with a tilt amount that is less than the current tilt input values. At the transition from section B to section C, a drive signal with no gain can be applied. During section C, positive gain can again be applied, with the drive signals corresponding to higher tilt values than the currently input tilt amounts. This pattern can repeat. By applying positive gain (e.g., generally while the tilt input amount is increasing) and by applying negative gain (e.g., generally while the tilt input amount is decreasing), the drive signals can be applied predictively. The drive signals can be effectively phase shifted to be ahead of the input signals.

Figure 23:
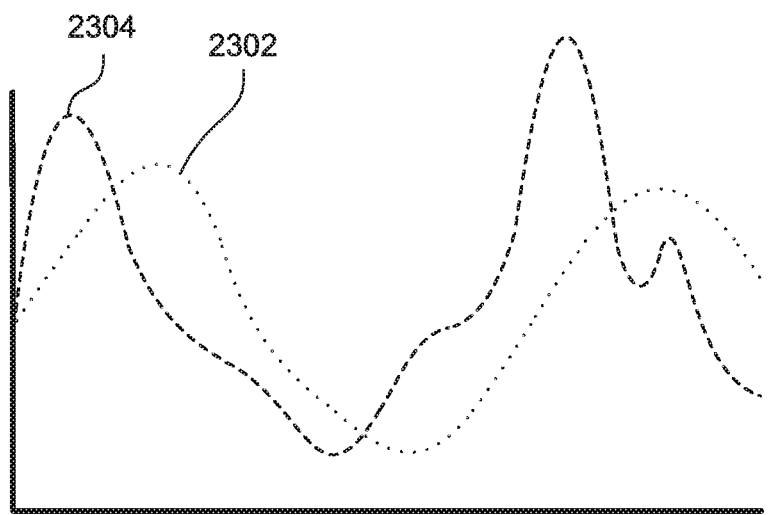
FIG. 23 shows an example embodiment of a tilt input signal and associated input shaped command signal.

In FIGS. 21 and 22, the input tilt signals are sine waves, and the input signals, command signals, and tilt response all have the same amplitude and shape. Other variations are possible. For example, in FIG. 20, the input signals 2002, command signals 2004, and tilt response 2006 have different amplitudes. Other shapes and amplitudes can be used. FIG. 23 shows an example with tilt input signals 2302 that deviate from a true sine wave. The drive signals 2304 can be effectively phase shifted, as discussed herein, and can also be input shaped, overdriven and/or underdriven, as discussed herein. Input shaping functions can be applied to distort the oscillating signal to deviate from the shape (e.g., sinusoidal shape) of the input tilt signals. In some cases, the oscillating signal can be decomposed into its frequency components. There can be a base frequency, and a plurality of harmonic frequencies, for example, although other frequencies can be present. In some cases, a Fourier transform can be applied to transfer the signal to the frequency domain. The signals can be modified, for example by adding additional frequency content to the signal. This can distort the oscillating signal, which can help with input shaping. For example, higher frequency content can be added for input shaping, which can distort the input sinusoidal or other oscillating wave shape.

Figure 24:
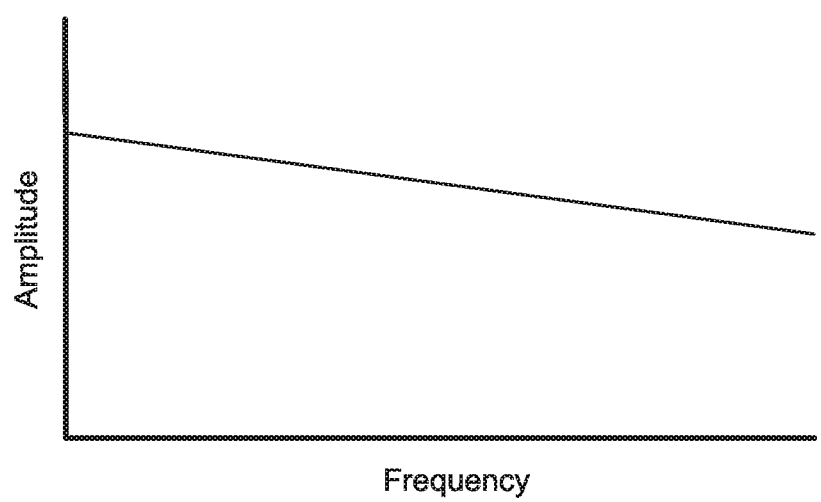
FIG. 24 shows an example plot of phase loss.

FIG. 24 is a plot showing an example of phase loss. The x-axis is frequency and the y-axis is tilt amplitude. If the drive voltage is kept the same, then as the frequency increases, the sustainable amplitude would go down. For example, at higher frequencies, the fluid interface can start to move toward the target peak tilt amount, but it may need to change direction and start tilting the other direction before it reaches that peak tilt amount, for example, because of the phase lag. Accordingly, to achieve a desired amplitude of oscillating tilt, the amplitude of the drive signals may need to be increased as the frequency of the oscillations increases. Accordingly, the plots of FIGS. 21 and 22 can be modified so that the drive signals, tilt input, and/or tilt response can have different amplitudes (e.g., see FIGS. 20 and 23). The liquid lens systems can be configured to apply a transfer function, or phase gain filter, or other operation that can be tuned or optimized for various different frequency values or ranges, such as 3 Hz, 5 Hz, 6 Hz, 7 Hz, 8 Hz, 9 Hz, 10 Hz, 11 Hz, 12 Hz, 13 Hz, 15 Hz, or any ranges or values therein, although other configurations are possible. By way of example, if the operation is tuned for 8 Hz, then the input signal and resulting tilt response can have substantially the same amplitude for oscillating signals at about 8 Hz. As the frequency varies further from 8 Hz, the same operation can be applied, but can result in increasing amplitude disparity between the input tilt signal and the resulting tilt response.

In some cases, a transfer function can be applied to determine the drive signals from the input tilt signals. For example, the gain values (e.g., positive gain and/or negative gain) can be set based on the input tilt signals. In some cases, a lookup table can be used. In some cases, an equation or formula can be used. In some embodiments, the transfer function can be implemented using hardware, such as using analog circuits. The drive signals can be determined based at least in part on an angular velocity of the input tilt signals. For example, the slope of the line 2202 at various points can correspond to gain values, which can be applied to determine the corresponding points for line 2204. In some cases, the gain and/or values of the drive signals 2204 can be determined using the angular position, angular velocity, and/or angular acceleration, or any combination thereof. In various embodiments, the controller can determine a target driving tilt amount and then set the drive signals for the electrodes (e.g., voltage values) according to that target driving tilt amount, even if it may be different than the true target tilt amount. This can be used for overdriving or underdriving the command signals. In some embodiments, a Bessel filter (e.g., a modified Bessel filter) can be used to determine the drive signals based on the input tilt signals. Various other suitable filters, transfer functions, and gain approaches could be used to determine the drive signals from the input tilt signals, for example.

In some embodiments, a step input signal can be provided to the liquid lens, and the fluid interface response can be observed. This can provide the coefficients for the liquid lens system (e.g., the coefficient of damping and the coefficient of stiffness). This can then provide the basis for input shaping the sinusoidal response, for setting the gain values, transfer function, etc. In some cases, an iterative approach can be used to find the best input shaped signals for a particular liquid lens design and/or use. In some cases, a feed forward control system can be used to drive the liquid lens based on the input tilt signals. The phase gain filter and the input shaping signals to reduce coma or other dynamic wavefront error can be applied together or separately. In some cases, an open loop filter can be used. The system can feed the tilt input signal forward and try to correct the phase lag.

Input shaping can sometimes be performed using mechanical systems, such as those having mechanical springs. Without being bound by theory, in the liquid lens, it is believed that the fluid interface of the liquid lens can operate similar to a spring. Because the interface is based on the surface tension of the fluids, the resulting spring would be expected to be weak. However, with small volume chambers, like those used in some embodiments of liquid lenses disclosed herein, the spring provided by the fluid interface can provide a significant or dominant force in the liquid lens. Accordingly, one surprising result is that input shaping, phase gain filters, etc., as discussed herein can operate on a fluid interface, such as in a liquid lens.

Figure 25:
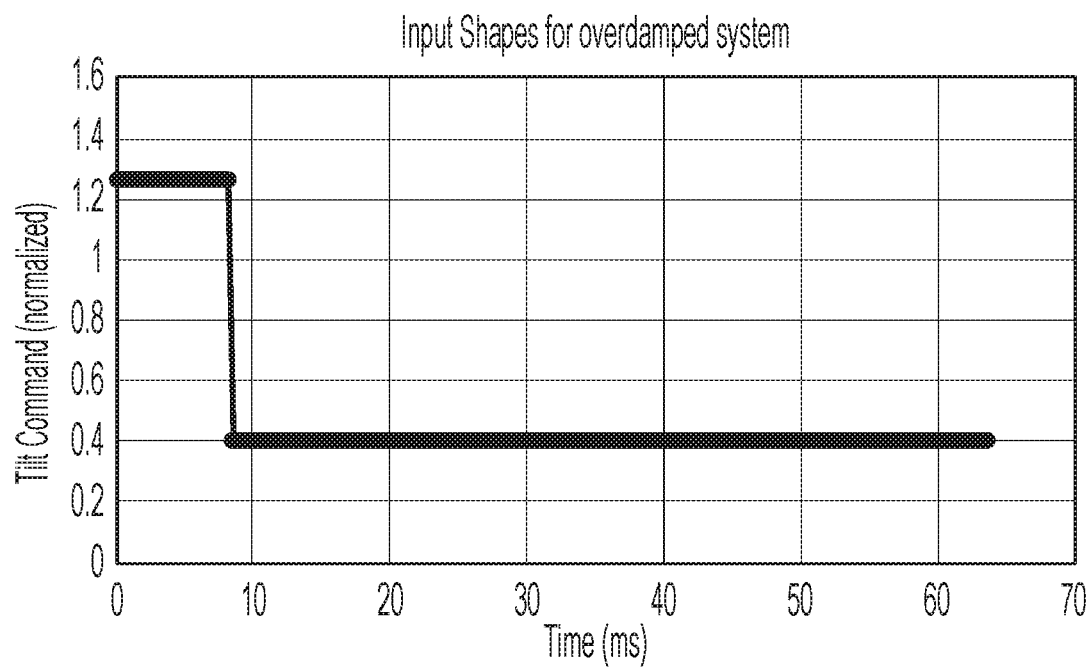
FIG. 25 shows an example embodiment of command signals for a step response in an overdamped liquid lens system.
Figure 26:
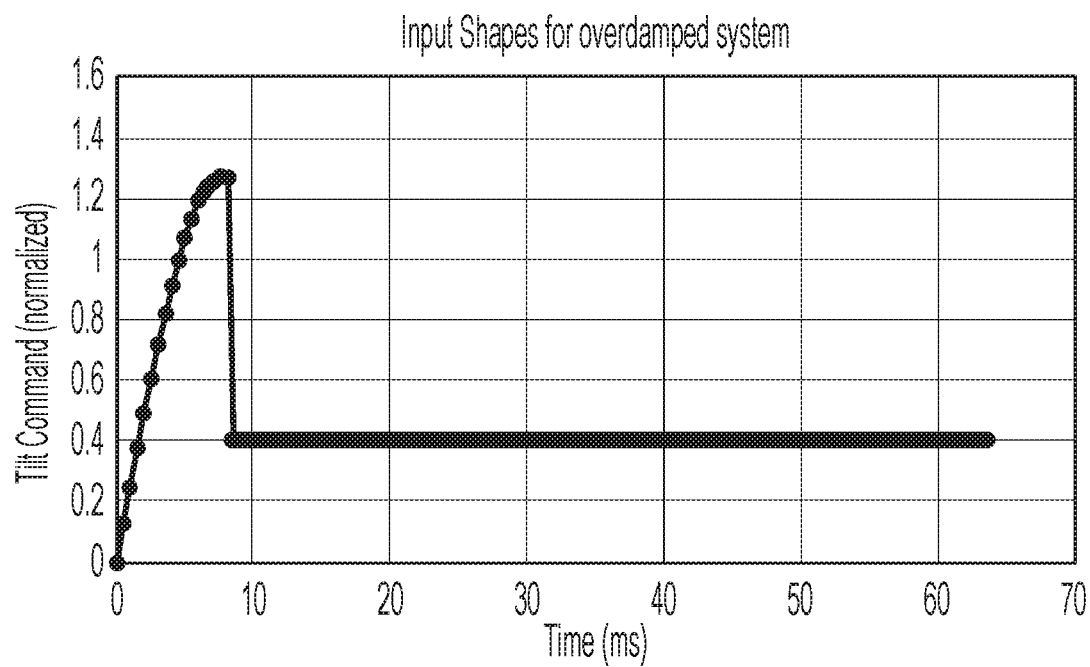
FIG. 26 shows an example embodiment of command signals for a step response in an overdamped liquid lens system.

Various embodiments disclosed herein can relate to underdamped systems. In some cases, input shaping, overdriving, etc. can be applied to overdampled liquid lenses as well. For example, FIG. 25 shows an example embodiment in which a tilt response changes from 0 degrees to 0.4 degrees. The command signals can be overdriven. For example, the command signals associated with a tilt of about 1.3 degrees can be delivered, for overdriving the fluid interface. Then, once the tilt is at or approaching the target tilt of 0.4 degrees, the drive signals can be transitioned to the values associated with the target tilt amount (e.g., 0.4 degrees). This approach can overdrive the fluid interface unit to improve the response time, allow more time for settling, and reduce dynamic wavefront error (e.g., coma). FIG. 26 is similar to FIG. 25, except that the overdriven signal is not set to a maximum value initially. Rather, the drive signal can ramp up to the voltage corresponding to the target tilt (e.g., 0.4 degrees in this example), and then continue to ramp up to the overdriven values. In some cases, the shape of the ramping up signal can be parabolic. Then, when the fluid interface is at or near the target tilt amount, the drive signals can drop to the values associated with the target tilt amount (0.4 degrees in this example). In the over damped embodiments, in some cases, input shaping can be applied, but in some cases no underdriving is performed. The more gradual ramping up of the signal in FIG. 26 can result in less dynamic wavefront error, as compared to the approach of FIG. 25.

Additional Details

In the disclosure provided above, apparatus, systems, and methods for control of a lens are described in connection with particular example embodiments. It will be understood, however, that the principles and advantages of the embodiments can be used for any other applicable systems, apparatus, or methods. While some of the disclosed embodiments may be described with reference to analog, digital, or mixed circuitry, in different embodiments, the principles and advantages discussed herein can be implemented for different parts as analog, digital, or mixed circuitry. In some figures, four electrodes (e.g., insulated electrodes) are shown. The principles and advantages discussed herein can be applied to embodiments with more than four electrodes (e.g., eight electrodes) or fewer than four electrodes.

The principles and advantages described herein can be implemented in various apparatuses. Examples of such apparatuses can include, but are not limited to, consumer electronic products, parts of the consumer electronic products, electronic test equipment, etc. The principles and advantages described herein relate to lenses. Examples products with lenses can include a mobile phone (for example, a smart phone), healthcare monitoring devices, vehicular electronics systems such as automotive electronics systems, webcams, a television, a computer monitor, a computer, a hand-held computer, a tablet computer, a laptop computer, a personal digital assistant (PDA), a refrigerator, a DVD player, a CD player, a digital video recorder (DVR), a camcorder, a camera, a digital camera, a copier, a facsimile machine, a scanner, a multi-functional peripheral device, a wrist watch, a clock, etc. Further, apparatuses can include unfinished products.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The processor(s) and/or controller(s) described herein can be coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The processor(s) and/or controller(s) described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed by a processor (e.g., a microprocessor) and/or other controller elements in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values (e.g., within a range of measurement error).

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example, ±1%, ±3%, ±5%, ±10%, ±15%, etc.). For example, "about 3.5 mm" includes "3.5 mm." Recitation of numbers and/or values herein should be understood to disclose both the values or numbers as well as "about" or "approximately" those values or numbers, even where the terms "about" or "approximately" are not recited. For example, recitation of "3.5 mm" includes "about 3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

What is claimed is:

1. A liquid lens system comprising:
   a liquid lens comprising:
      a chamber;
      a first fluid contained in the chamber;
      a second fluid contained in the chamber;
      an interface between the first fluid and the second fluid;
      a plurality of driving electrodes insulated from the first and second fluids; and
      a common electrode in electrical communication with the first fluid, wherein a position of the interface is based at least in part on voltage differentials applied between the plurality of driving electrodes and the common electrode;
   a signal generator configured to apply the voltage differentials between the plurality of driving electrodes and the common electrode;
   a controller configured to:
      access angular velocity data indicative of an angular velocity of movement of the liquid lens;

determine drive voltage signals at least in part by:
applying positive gain values for a first angular velocity range;
applying negative gain values for a second angular velocity range; and
cause the signal generator to provide the drive voltage signals to one or more of the corresponding driving electrodes.

2. The liquid lens system of claim 1, wherein the controller is configured to implement optical image stabilization.

3. The liquid lens system of claim 1, wherein the controller is configured to determine the drive voltage signals based additionally in part on target focal length information.

4. The liquid lens system of claim 1, wherein the controller is configured to perform a transfer function to apply the positive gain and to apply the negative gain.

5. The liquid lens system of claim 1, wherein the controller is configured to determine drive voltage signals at least in part applying a phase gain filter.

6. The liquid lens system of claim 1, wherein the controller is configured to determine drive voltage signals at least in part applying a Bessel filter.

7. The liquid lens system of claim 1, wherein the controller is configured to apply the positive gain and the negative gain to effectively phase shift the drive voltage signals ahead of the angular velocity data.

8. The liquid lens system of claim 1, wherein the controller is configured to determine elevated target tilt angles that are greater than actual tilt angles of the liquid lens for applying the positive gain to provide overdriven drive voltage signals, and wherein the controller is configured to determine attenuated target tilt angles that are lesser than actual tilt angles of the liquid lens for applying the negative gain to provide underdriven drive voltage signals.

9. The liquid lens system of claim 1, wherein the drive voltage signals are input shaped signals.

10. The liquid lens system of claim 1, wherein the controller is configured to determine the drive voltage signals by adding frequency content at one or more frequencies above an oscillation frequency of the movement of the liquid lens.

11. A dynamic lens system comprising:
a chamber containing an interface between a first fluid and a second fluid;
a plurality of electrodes, wherein the interface is movable by applying drive signals to the plurality of electrodes;
a signal generator configured to deliver the drive signals to the plurality of electrodes; and
a controller configured to:
receive target tilt information;
determine an input shaped drive signal based at least in part on the target tilt information; and
cause the signal generator to output the input shaped drive signals to tilt the interface.

12. The dynamic lens system of claim 11, where the controller is configured to:
cause the signal generator to output overdriven drive signals to the electrodes, wherein the overdriven drive signals correspond to tilt amounts larger than the target tilt information; and
cause the signal generator to output underdriven drive signals to the electrodes, wherein the underdriven drive signals correspond to tilt amounts lesser than the target tilt information.

13. The dynamic lens system of claim 11, wherein the target tilt information comprises oscillating target tilt amounts for optical image stabilization.

14. The dynamic lens system of claim 13, wherein the controller is configured to apply a Bessel filter to determine the drive signals.

15. The dynamic lens system of claim 13, wherein the controller is configured to apply a transfer function to determine the drive signals.

16. The dynamic lens system of claim 13, wherein the controller is configured to effectively phase shift the drive signals.

17. The dynamic lens system of claim 11, wherein the target tilt information comprises a target tilt step response.

18. A method for tilting an interface of a liquid lens, the method comprising:
accessing target tilt information corresponding to target tilt amounts for the interface of the liquid lens, the liquid lens comprising:
the interface between a first fluid and a second fluid; and
a plurality of electrodes configured to control the interface;
during a first time period, applying overdriven drive signals to the electrodes, wherein the overdriven drive signals correspond to tilt amounts larger than the target tilt amounts; and
during a second time period, applying underdriven drive signals to the electrodes, wherein the underdriven drive signals correspond to tilt amounts lesser than the target tilt amounts.

19. The method of claim 18, wherein the overdriven drive signals and the underdriven drive signals at least partially compensate for phase lag that results from tilting the interface.

\* \* \* \* \*